US006222546B1

(12) United States Patent
Yokoyama et al.

(10) Patent No.: US 6,222,546 B1
(45) Date of Patent: Apr. 24, 2001

(54) IMAGE PROCESSING DEVICE, IMAGE PROCESSING METHOD, GAME DEVICE, AND CRAFT SIMULATOR

(75) Inventors: Takayuki Yokoyama; Ichiro Kawaoka; Taishi Yasuda; Masayoshi Yamada; Mitsuru Kawamura; Toshiyuki Maeda, all of Tokyo (JP)

(73) Assignee: Kabushiki Kaisha Sega Enterprises, Tokyo (JP)

( * ) Notice: Subject to any disclaimer, the term of this patent is extended or adjusted under 35 U.S.C. 154(b) by 0 days.

(21) Appl. No.: 09/251,482

(22) Filed: Feb. 17, 1999

Related U.S. Application Data

(62) Division of application No. 08/898,466, filed on Jul. 24, 1997.

(30) Foreign Application Priority Data

Jul. 25, 1996 (JP) .................................................. 8-196583
Jul. 25, 1996 (JP) .................................................. 8-196712

(51) Int. Cl.[7] ...................................................... G06F 15/00
(52) U.S. Cl. ............................................................... 345/418
(58) Field of Search .................................. 345/473, 474, 345/475, 418, 419, 121

(56) References Cited

U.S. PATENT DOCUMENTS

| 5,307,452 | * 4/1994 | Hahn et al. ........................... 345/432 |
| 5,353,074 | 10/1994 | Jones et al. ........................... 353/122 |
| 5,524,197 | 6/1996 | Uya et al. ............................. 395/157 |
| 5,537,641 | 7/1996 | da Vitoria Lobo et al. ......... 395/119 |
| 5,671,381 | 9/1997 | Strasnick et al. .................... 395/355 |
| 5,682,326 | 10/1997 | Kingler et al. .................... 364/514 A |
| 5,682,511 | 10/1997 | Sposato et al. ...................... 395/353 |
| 5,977,978 | * 11/1999 | Carey et al. ......................... 345/419 |

FOREIGN PATENT DOCUMENTS 9-94348   4/1997 (JP) .

* cited by examiner

*Primary Examiner*—Phu K. Nguyen
(74) *Attorney, Agent, or Firm*—Finnegan, Henderson, Farabow, Garrett & Dunner, L.L.P.

(57) ABSTRACT

To achieve a more realistic and richer shifting field, such as water surface over which a jet-ski or other object travels, thereby heightening the interest and ambiance of the game.

An image processing device for processing image data for moving an object such as a watercraft over a water surface in three-dimensional space. Comprises means for cyclically shifting the height at given positions of the water surface over time (CPU 101) and means for moving the watercraft while contacting the water (CPU 101). Determination of contact between watercraft and water surface, watercraft tilt correction, boat wake drawing processing, and the like are performed by the CPU 101.

6 Claims, 28 Drawing Sheets

| ex No. | SWELL HEIGHT SETTING H |
|---|---|
| 0 | 0.0 |
| 1 | 0.1 |
| 2 | 0.2 |
| 3 | 0.3 |
| 4 | 0.4 |
| 5 | 0.5 |
| 6 | 0.6m |

(4×4 DISPLAY AREA)

SINGLE OBJECT
COMPRISING
100 POLYGONS

IMAGE PROCESSING DEVICE, IMAGE PROCESSING METHOD, GAME DEVICE, AND CRAFT SIMULATOR

This is a division of application Ser. No. 08/898,466, filed Jul. 24, 1997.

TECHNICAL FIELD

The present invention relates to an image processing device, an image processing method, a game device, and a craft simulator, and more particularly to an image processing method, a game device, and a craft simulator adapted for use with games, such as those simulating a boat, jet-ski, or other watercraft traveling over the surface of water, employing a three-dimensional virtual space in which a field through which the characters move shifts temporally and spatially.

BACKGROUND ART

In recent years, game devices which utilize image processing technology, whether for home or business use, have come to offer clearer and more realistic images, thereby creating a demand for enhanced and diversified game content.

One area in which game devices of this design are known is that of game devices for driving games (car race games). In driving games, realistic simulation of vehicle motion is of particular importance. Conventional simulations employ a material point model in which the vehicle is placed at a single material point, such as the location of center of gravity. In one known method, the mode of contact (touch) between the vehicle and the ground is determined using this single point. In driving games, creating special effects for vehicle movement has now become essential. Widely employed special effects include dust clouds and tire tread marks.

In games which simulate watercraft, such as boats and jet-skis, a water surface (or ocean surface) constitutes the field through which the object moves. There are some crucial differences between a water surface and a land surface in terms of the characteristics of the field. As may be readily seen from the differences between the two in real space, the spatial position of the course traveled by the vehicle does not change over time, while a water surface ordinarily shifts due to wind and waves.

Accordingly, data for the field in a vehicle game, that is, the three-dimensional space which forms the countryside and road, can be fixed data. In contrast, in the field used in a watercraft game, namely, a water surface, the height of the water surface at any given location must be made to change over time in order to provide a more realistic simulation. Since the adoption of design rules for conventional car games makes it impossible to produce anything but a water surface that is stationary over time, games designed using such rules have monotonous motion and lack a realistic game feel. This is particularly problematic for race games in which several boats compete in terms of speed and position, and poses a significant handicap to creating a game that is interesting.

Despite this state of affairs, there have been no previous proposals for creating shifting water surface (field) image data in a simple and realistic manner. Needless to say, no satisfactory specific proposals have been made regarding methods for accurately determining the mode of contact (touch) with a water surface, or methods for image processing of water surface-related special effects, such as a wake.

Some games which simulate watercraft such as boats and jet-skis employ a craft simulator (rocking component) which the player actually mounts for simulated operation. In this type of game, during the course of the game, the rider, sitting astride a rocking component simulating an actual watercraft, operates the handle or other controls to steer the craft, whereupon a turning radius which generally reflects the steering input, specifically, the steering angle, in the game is determined, the appropriate motion is simulated, and the rocking component tilts in response to the steering angle to provide the simulated experience of turning. Accordingly, steering relies on handle control exclusively.

However, when a jet-ski, motor boat, or other watercraft traveling over a water surface attempts to turn smoothly, it is necessary, in addition to controlling the handle, to appropriately shift one's body weight to the left or to the right, as the turning radius is also affected by tilt of the craft induced by shifting body weight.

Conventional craft simulators are operated by handle control exclusively and do not accommodate any shifting of body weight. The rider cannot tilt the rocking component by shifting body weight, making the motion of the craft quite different from that of actual operation. Accordingly, the game lacks realism and fails to provide a realistic and exciting experience.

The present invention was developed with the foregoing in view, and has as an object to provide an image processing device, an image processing method, and a game device which afford more realistic and enhanced representation of a shifting field, such as a water surface, over which a motor boat, jet-ski, or other object travels, and to provide a more interesting watercraft game.

A second object of the present invention is to achieve accurate image processing whereby the mode of contact (touch) between water surface and watercraft in a three-dimensional virtual space can be determined accurately, and errors in height processing for the water surface and watercraft can be eliminated.

A third object of the present invention is to provide an image processing method that can accurately represent boat wakes, objects submerged in the water, and the like with reduced processing.

A fourth object of the present invention is to provide a game device capable of providing a realistic virtual reality experience simulating travel of a craft ridden by the player over the water.

A fifth object of the present invention is to provide a craft simulator whereby the rocking component can be tilted appropriately through a combination of steering and shifts in body weight by the rider, thereby providing a realistic sensation similar to that of turning an actual craft.

SUMMARY OF THE INVENTION

An object of the present invention is to provide an image processing device which affords more realistic and enhanced representation of a temporally shifting field, such as a water surface, over which a jet-ski or other object travels and which provides a more interesting watercraft game and enhanced ambiance. Accordingly, the image processing device which pertains to the present invention comprises means for processing image data whereby a watercraft or object may be moved over a water surface in a three-dimensional virtual space, means for periodically varying over time the height of the water surface at given locations, and means for moving a watercraft while in contact with the water. Further, watercraft-to-water surface contact stabilization, watercraft tilt correction, watercraft wake image processing, and the like are performed.

A further object of the present invention is to provide a craft simulator whereby a rocking component ridden by the rider can be tilted appropriately through a combination of steering and shifting of body weight, thereby affording a realistic sensation close to that of turning an actual craft. Accordingly, the craft simulator which pertains to the present invention comprises a rocking component which is ridden by the rider, steering means provided to the rocking component, steering angle sensor means for sensing the steering angle of the steering means, support means for tiltably supporting the rocking component, left and right tilting cylinders which function so as to maintain lateral tilt equilibrium for the rocking component, and pressure regulation means for regulating the pressure applied to the left and right tilting cylinders on the basis of sensor output signals from the steering angle sensor means.

DESCRIPTION OF THE PREFERRED EMBODIMENTS

Embodiments of the present invention will be described making reference to the appended drawings. Referring first to FIGS. 1 through 5, a design for the craft simulator of the present invention (first embodiment) will be described; this will be followed by a description of image processing in the present invention, making reference to FIGS. 6 through 21. Another design for the craft simulator (second embodiment) will then be described, making reference to FIGS. 22 through 32.

(Description of Design of First Embodiment of Craft Simulator)

Figure 1:
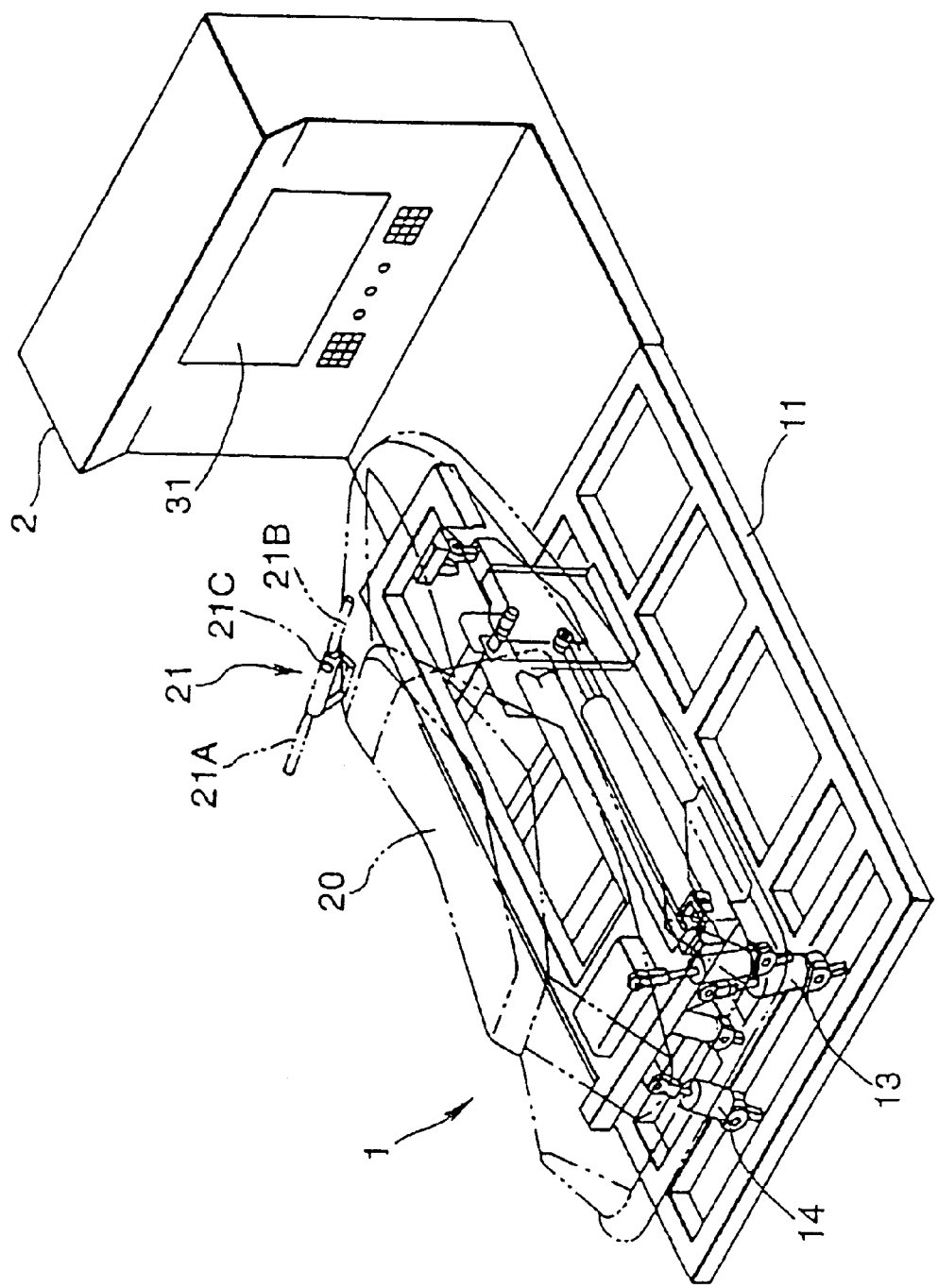
FIG. 1 is an external view of a jet-ski game device pertaining to one embodiment of the present invention.

First, referring to FIGS. 1 through 5, the design of the first embodiment of a craft simulator designed to exchange prescribed control signals with the image processing device of the present invention and to move in the same way as a character (for example, a jet-ski) displayed on the screen will be described. FIG. 1 is an external view of a jet-ski game device pertaining to this embodiment. This game device has as its game content a jet ski race. While not shown, it would be possible to provide a plurality of networked jet ski game devices like that depicted in FIG. 1 so that multiple players could compete on a water race course set up in three-dimensional virtual space, or, in the case of single-player play, for the player to compete against competitors (rival boats) preprogrammed into the device. In the game device of this embodiment, the object is a jet-ski, but game devices pertaining to other watercraft, such as a motor boat, would be implemented in the same manner.

The jet-ski game device shown in FIG. 1 comprises a cage 1 in which the player rides, and a data processing section 2 which actuates the mechanism of this cage 1.

Figure 2:
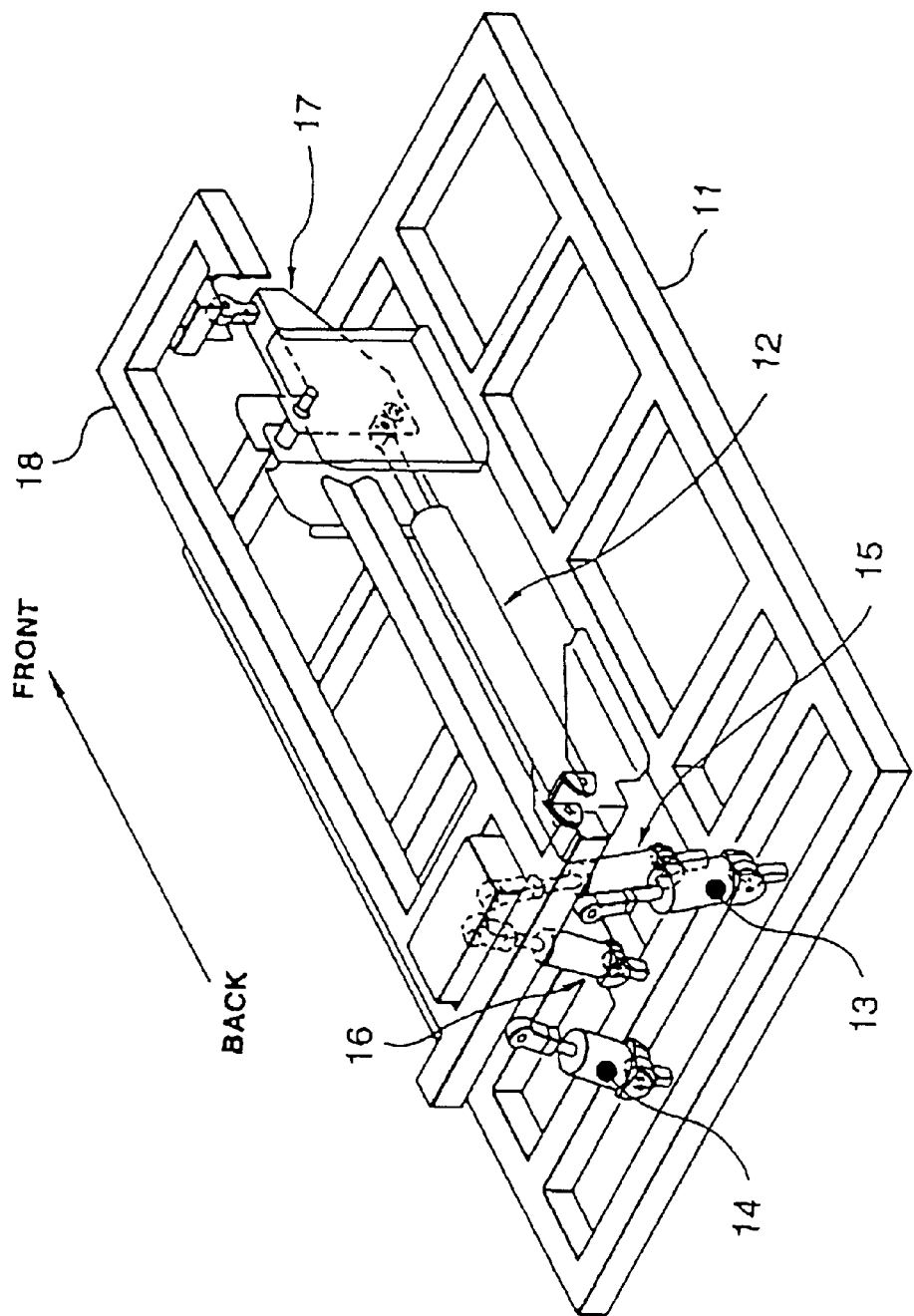
FIG. 2 is a simplified perspective view showing the suspension mechanism of the cage of the game device.

As shown in FIG. 2, the cage 1 is equipped at its bottom with a mecha base 11. A moving base 18 is installed above the mecha base 11, supported by a suspension mechanism comprising cylinders 12 through 16 and a crank 17. The moving base 18 is mobile with respect to the mecha base 11. A saddle member 20 which the player straddles is secured to the top of the moving base 18, and a handle member 21 that can be turned within a prescribed turning angle range is rotatably disposed at the front end of the saddle member 20. This handle member 21 is provided with a handle 21A, and accelerator 21B, a view change switch 21C, and the like for the player to input control data to the data processing section 2.

During the game, the player can turn the handle 21A to output a signal indicating the angle at which the player's jet-ski (player's craft) advances, and operate the accelerator 21B to output a signal indicating the speed at which the player's craft advances, to the data processing section 2. By operating the view change switch 21C, a view change signal for switching between a viewpoint from the front of the player's craft and a viewpoint looking at the player's craft obliquely from the rear can be output to the data processing section 2.

As shown in FIG. 2, between the mecha base 11 and the moving base 18 of the cage 1 are disposed an air-type center cylinder 12, left and right link rod cylinders 13 and 14, left and right centering cylinders 15 and 16, and a front end crank 17. The center cylinder 12 is disposed at a location in the center of the mecha base 11 in the lateral (left-right) direction, lying sideways in the longitudinal direction, and can be extended and retracted between a prescribed location at the back end of the mecha base 11 and a prescribed location on the crank 17 (see FIGS. 4 and 5). The crank 17 is rotatably attached at a prescribed location on the top of a support component which projects upward from a prescribed location at the front end of the mecha base 11. This prescribed location on the top serves as the center of crank rotation. The crank 17 is joined to the moving base 18 via a spherical bearing.

Figure 3:
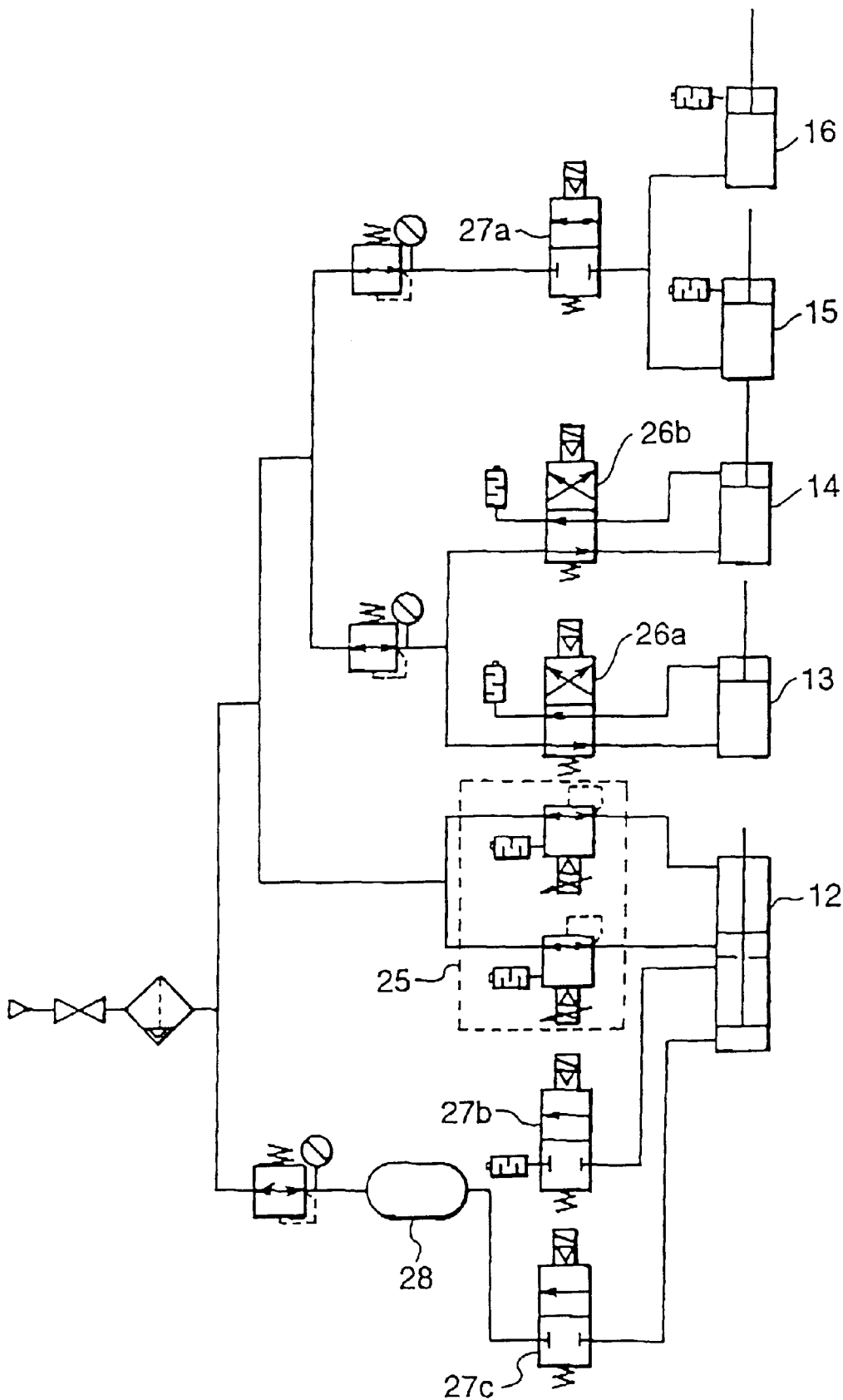
FIG. 3 is a system diagram of the air line system of the suspension mechanism.

As shown in detail in the line diagram in FIG. 3, the center cylinder 12 comprises serially coupled front and rear air cylinders having the same stroke. In the vertical pressure chamber at rear section, constant pressure is applied towards the extension side; an electrical pressure control device (an electropneumatic regulator) 25 is connected to the vertical pressure chamber in the front section. Since constant pressure is applied towards the extension side, when a load is placed on the moving base 18 such that force is applied in the direction of cylinder retraction, this force is balanced so that the position of the moving base 18 does not change. Accordingly, even when a load is applied due to a player mounting, the small amount of air supplied to the front end vertical pressure chambers is sufficient to actuate extension and retraction of the center cylinder 12. This makes it possible to use a relatively low-power electrical pressure control device 25. In FIG. 3, 26a and 26b indicate four-port valves, 27a and 27c indicate two-port valves, and 28 indicates an air tank.

As shown in FIG. 3, the electrical pressure control device 25 actually comprises two pressure control units, and can regulate the pressure in the front vertical pressure chambers in response to electrical pressure control signals received from the data processing section 2. The stroke position and stroke speed of the center cylinder 12 are controlled in accordance with this pressure control.

Figure 4:
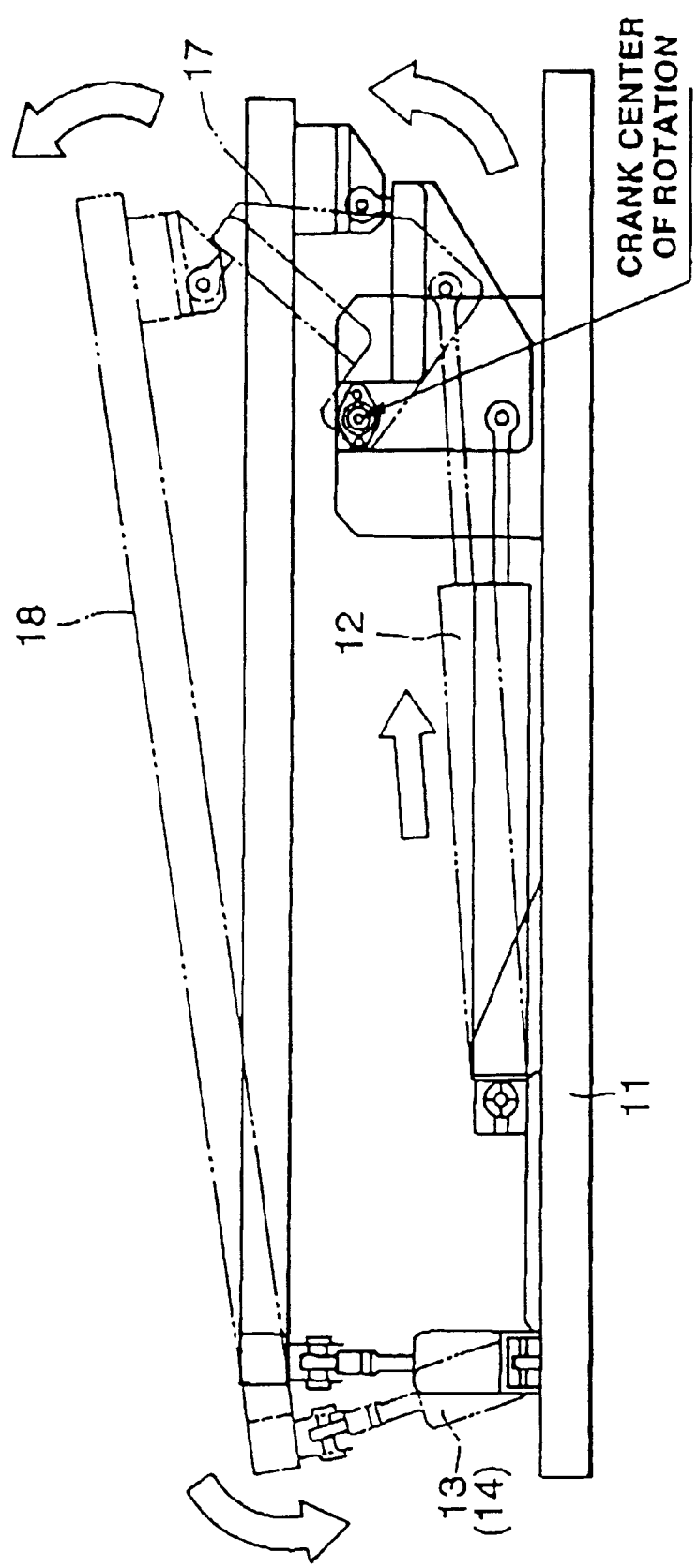
FIG. 4 is an illustrative diagram showing motion of the suspension mechanism in the pitching direction.
Figure 5:
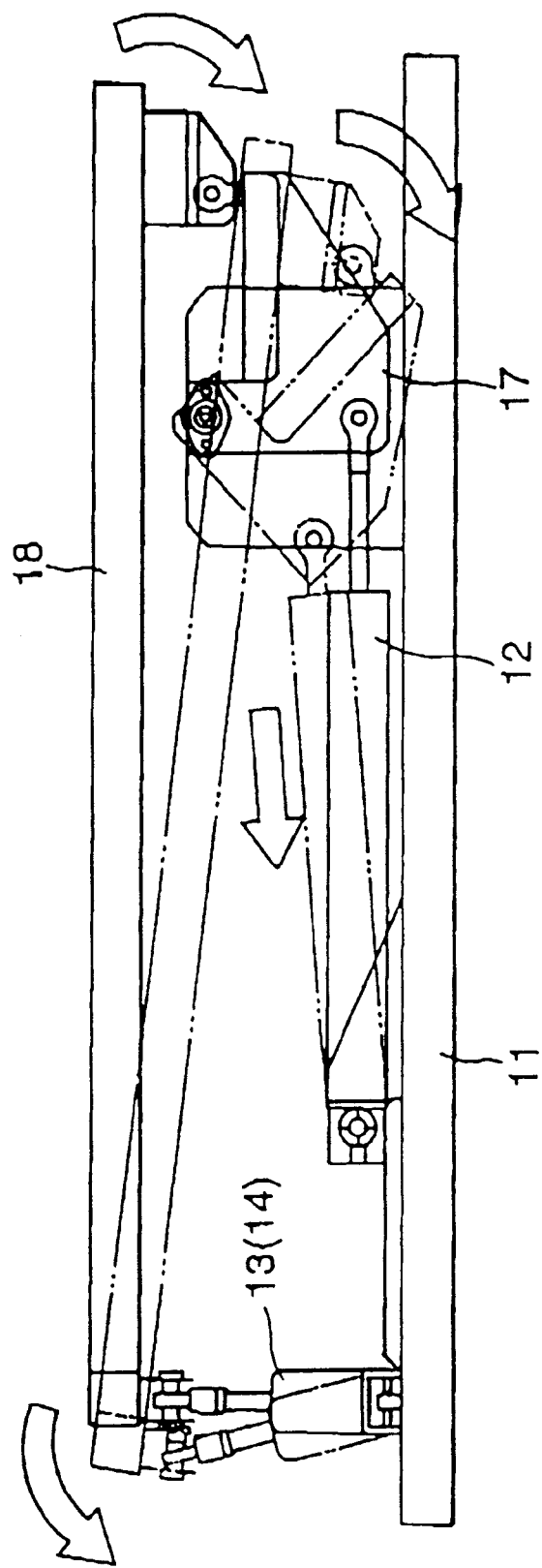
FIG. 5 is an illustrative diagram showing motion of the suspension mechanism in the pitching direction.

An example of control is illustrated in FIGS. 4 and 5. As shown in FIG. 4, when the center cylinder 12 is extended, the crank 17 is pushed such that the crank 17 rotates around its center of rotation. Since the crank 17 and the moving base 18 are coupled by a spherical bearing, the distal end of the moving base 18 is lifted upward. The link rod cylinders 13 and 14, which support the back of the moving base 18, tilt backward. Accordingly, entire moving base 18 experiences motion in the pitching direction whereby the front end rises and the back end falls. As shown in FIG. 5, pitching motion in the opposite direction is created when the center cylinder 12 retracts. By controlling the pressure control signals delivered to the electrical pressure control device 25, pitching motion can be imparted to the saddle member 20, allowing the player riding on the saddle member to experience motion in the pitching direction.

As shown in FIG. 2, the left and right link rod cylinders 13 and 14 are disposed slanting inward at a location to the very rear of the mecha base 11, forming a trapezoidal four-strut link member. Pressure is normally applied toward the extension side in the link rod cylinders 13 and 14, preventing them from retracting when a load is applied. When force acting in the roll direction is applied to the moving base 18, a motion which is a synthesis of a rolling motion, in which the center of moving base 18 is shifted as it drops, with an arc motion of the moving base 18 centered on the spherical bearing at its front end is produced. This makes possible a three-dimensional undulating motion.

As shown in FIG. 2, the left and right centering cylinders 15 and 16 are disposed slanting inward at a location forward of the link rod cylinders 13 and 14. These perform a spring function. Thus, when external force applied to the moving base 18 is released, the moving base 18 is centered by the spring force provided by the centering cylinders 15 and 16.

(Description of Image Processing in the Present Invention)

Next, referring to FIGS. 6 through 22, image processing in the present invention will be discussed in terms of "design" and "principle of operation".

(Design)

First, the data processing section 2 will be discussed on the basis of FIG. 6. This data processing section 2 is equipped with a main processing unit 30, a TV monitor 31, and a speaker 32. The TV monitor 31 displays the jet-ski race game images; a projector could be used in place of a TV monitor.

The main processing unit 30 is equipped with a CPU (central processing unit) 101, and is also equipped with ROM 102, RAM 103, a sound device 104, an input/output interface 106, a scroll data calculating device 107, a co-processor 108, terrain data ROM 109, a geometrizer 110, shape data ROM 111, a drawing device 112, texture data ROM 113, texture map RAM 114, a frame buffer 115, an image synthesizing device 116, and a D/A converter 117.

Polygons are used for image display. Polygon data refers to data groups of relative and absolute coordinates for each apex of a polygon consisting of a collection of a plurality of points.

The terrain data ROM 109 stores relatively loosely defined polygon data sufficient to make determinations as to contact between watercraft and water surface, described later. In contrast, the shape data ROM 111 stores more specifically defined polygon data pertaining to the shapes which make up the watercraft, water surface, background, and other image elements.

The CPU 101 is connected via a bus line to the ROM 102 which stores the prescribed programs and the like, the RAM 103 which stores data, the sound device 104, the input/output interface 106, the scroll data calculating device 107, the co-processor 108, and the geometrizer 110. The RAM 103 functions as a buffer, and writes various commands to the geometrizer 110 (such as object display commands and the like), and it writes matrices for conversion matrix calculation.

The input/output interface 106 is connected to the input/output device 21 and the electrical pressure control device 25, various lamps, and other output devices, whereby operating signals from the handle of the input device 21 are supplied to the CPU 101 as digital values, while at the same time control signals generated by the CPU 101 and the like can be output to the electrical pressure control device 25. The sound device 104 is connected to the speaker 14 via a power amplifier 105 and sound signals generated by the sound device are amplified before being fed to the speaker 32.

In this embodiment, the CPU 101 reads in operating signals from the input device 21 based on a program stored in the ROM 102, terrain data from the terrain data ROM 109, and shape data from the shape data ROM 111 (three dimensional data for objects such as the player's craft and other watercraft, and background elements such as the water surface, sky, islands, trees, and rocks) and, at a minimum, conducts at least watercraft movement processing as well as water surface wave swell rendering/processing, water surface (wave)/watercraft contact (touch) determination/processing, processing for drawing wakes, and processing for rendering objects in the water.

Watercraft movement processing involves simulating the motion of the watercraft in three-dimensional virtual space in accordance with the operating signals given by the player via the input device 21. After coordinate values in the three-dimensional space have been determined, a conversion matrix for converting these coordinate values to a viewpoint coordinate system and shape data (watercraft, terrain, and the like) are designated to the geometrizer 110. The co-processor 108 is connected to the terrain data ROM 109, and predetermined terrain data is supplied to the co-processor 108 and to the CPU 101. The co-processor 108 principally makes determinations as to contact between watercraft and the water surface, and during this determination and watercraft movement calculations, it mainly undertakes floating point calculations. As a result, determinations as to contact between watercraft and the water surface are executed by the co-processor 108 and the results of the determination are provided to the CPU 101. Accordingly, the calculation load on the CPU 101 is reduced and contact determinations can be made more rapidly.

The geometrizer 110 is connected to the shape data ROM 111 and the drawing device 112. The shape data ROM 111 stores predetermined polygon shape data (three-dimensional data for watercraft, water surfaces, backgrounds, and the like consisting of several apices), and passes this shape data to the geometrizer 110. The geometrizer 110 carries out perspective conversion of the designated shape data using a conversion matrix supplied by the CPU 101 to produce data converted from the coordinate system in the three-dimensional virtual space to a visual field coordinate system.

The drawing device 112 applies texture to shape data that has been converted to a visual field coordinate system, and outputs this data to the frame buffer 115. In order to apply this texture, the drawing device 112 is connected to a texture data ROM 113 and a texture map RAM 114, as well as to the frame buffer 115.

The scroll data calculating device 107 calculates data for scrolling screens of text or the like, and this calculating device 107 and the aforementioned frame buffer 115 are connected via the image synthesizing device 116 and the D/A converter 117 to the TV monitor 13. Thereby, the polygon images of the watercraft, water surface, background, and the like stored temporarily in the frame buffer 115 are synthesized according to a designated priority with a scrolling image of text information indicating speed, lap time, and the like, to generate the final frame image data. This image data is converted to an analog signal by the D/A converter 117 and supplied to the TV monitor 13, which displays the watercraft race game images in real time.

Figure 6:
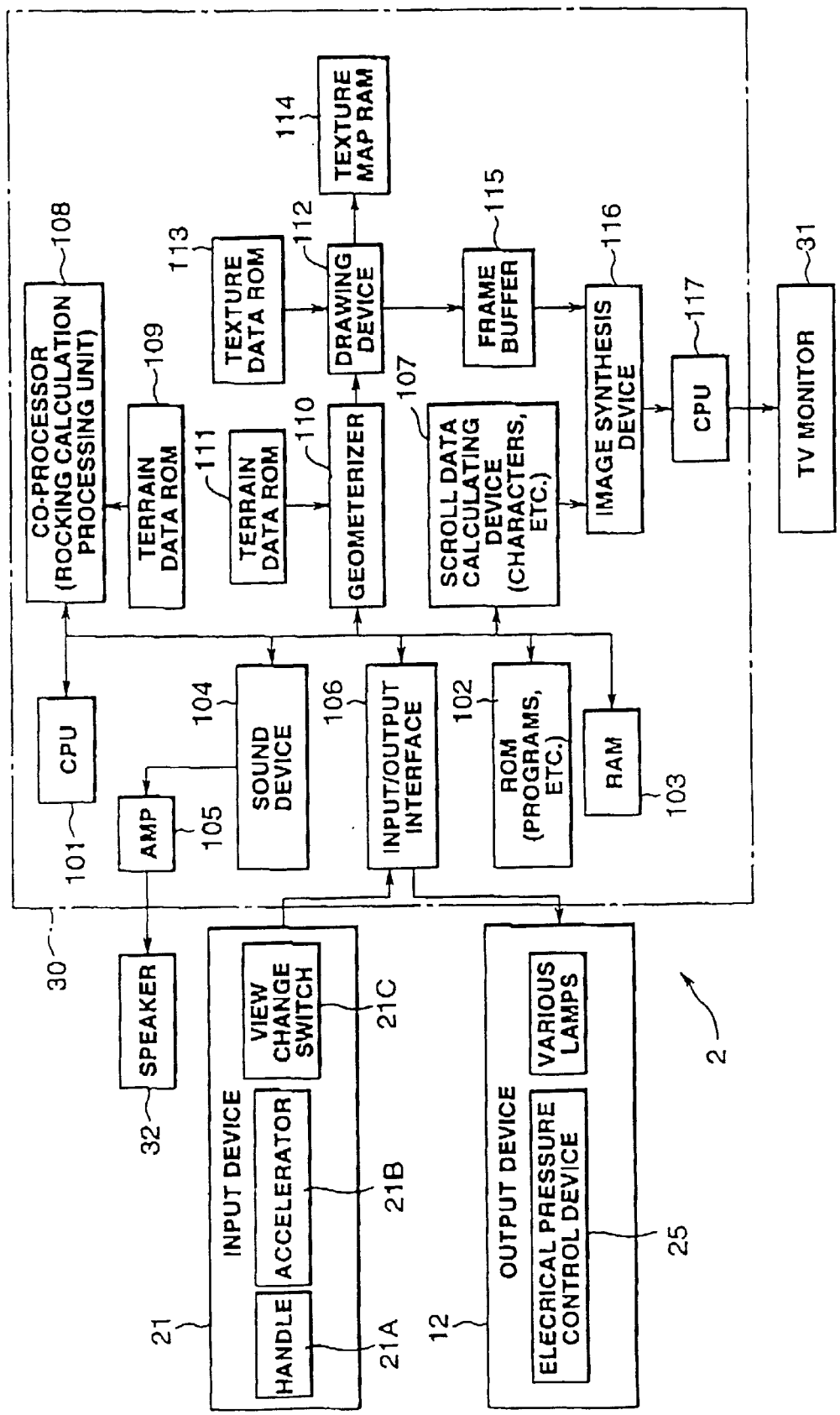
FIG. 6 is a simplified block diagram of the data processing section of the game device.

As shown in FIG. 6, the programs and data required for image processing in the present invention are stored in the ROM 102 (which stores image processing programs and the like), the terrain data ROM 109 and 111, and the texture data ROM 113. The invention is not limited to these ROM devices; the aforementioned programs and data may be stored in a recording medium of any configuration, and this recording medium employed in the image processing device of the present invention.

The recording medium referred to here is one capable of storing information by some physical means and that allows the image processing device of the present invention to execute the prescribed image processing. Specifically, the recording medium of the present invention stores programs for performing the image processing described in the Specification, and some or all of the processing required by the game.

Examples include a CD-ROM, DVD, ROM cartridge, CD-R, battery backup-equipped RAM memory cartridge, flash memory cartridge, nonvolatile RAM cartridge, game cartridge, floppy disk, bard disk, magnetic tape, or magnetooptical disk.

Communication media, such as phone line or other hardwired communication media, and microwave circuits or other wireless communication media are also included. The communication media referred to here also include the Internet.

(Basic Principle of Operation)

Next, the basic principle of this game device will be described referring to FIGS. 7 through 21. First, the entire process conducted by the CPU 101 will be described referring to FIG. 7, and the contents of the various steps will then be discussed referring to FIGS. 8 through 21.

(Contents of Entire Process (Step 201–Step 212))

When the game device is turned on, the CPU 101 initiates the process shown in the drawing by means of timer interrupt processes at fixed time intervals ($\Delta t$) corresponding to a single frame cycle.

Figure 7:
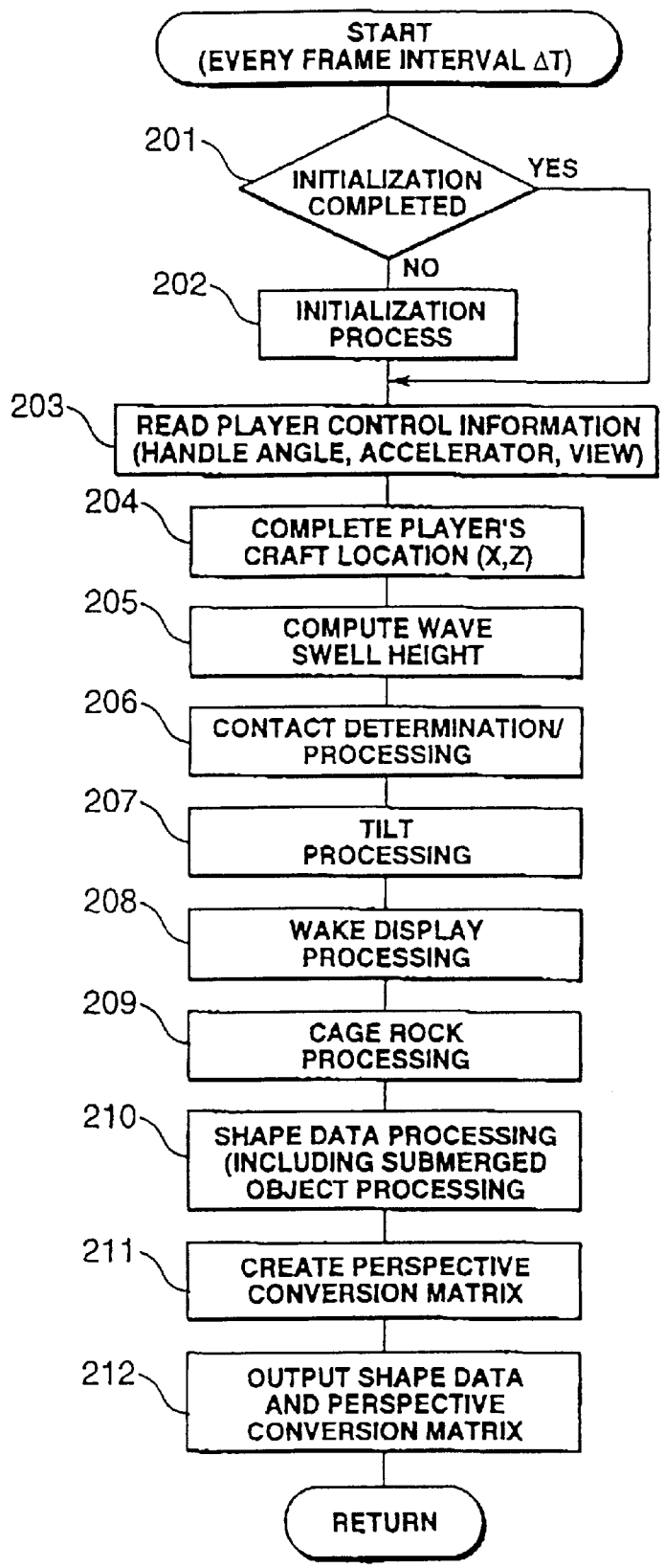
FIG. 7 is a simplified example flow chart of all the processes executed by the CPU.

First, it is determined whether prescribed variables have been initialized (step 201). While this determination process is not shown, it is accomplished by a flag process, for example. In the event that initialization has not been completed, that is, where the process illustrated in FIG. 7 is being started for the first time, an initialization step is executed (step 202).

Next, the operation information pertaining to jet-ski operation (in this case, handle steering angle, accelerator position, and the view change switch signal) input by the player through operation of the input device 21 is read by the CPU 101 as digital values via the input/output interface 106 (step 201). From this operation information, the CPU 101 employs the steering angle (i.e., the direction of advance) and the accelerator position (i.e., the speed at which the jet-ski is driven) to compute a position in a two-dimensional plane (x, z) within three-dimensional virtual space as the player's craft position during the current interrupt (step 204). Here, the x-z plane within three-dimensional virtual space is the plane of the field representing the water surface. Accordingly, wave height is expressed in the direction of the y axis.

Once the current position (x, z) has been determined, the CPU 101 sequentially calculates the swell height of waves on the water surface (step 205), performs wave-player craft contact determination/processing (step 206), performs processing of player's craft tilt relative to wave slope (step 207), performs processing for wake representation (step 208), and performs processing for rocking the cage 1 (step 209). These processes are an important feature of the present invention and will be discussed in further detail later. Of the processes mentioned above, the processes of steps 205 through step 207 can be executed in any suitable order, and need not be executed in the order given above.

When this series of processes has been completed, the processing required to draw shape data (polygon data), including processing for movement of the watercraft, is performed (step 210) with reference to the viewpoint instructed by the view change switch 21C. This processing includes processing for simple representation of submerged rocks and other objects, discussed later.

The CPU 101 also creates a perspective conversion matrix for perspective conversion of three-dimensional shape data into the visual field coordinate system (step 211). This matrix, together with shape data, is provided to the aforementioned geometrizer 110 via the RAM 103 (step 212).

This series of processes is executed during each frame interval of the TV monitor 31.

[Processing for Representing Swell (step 205)]

Figure 8:
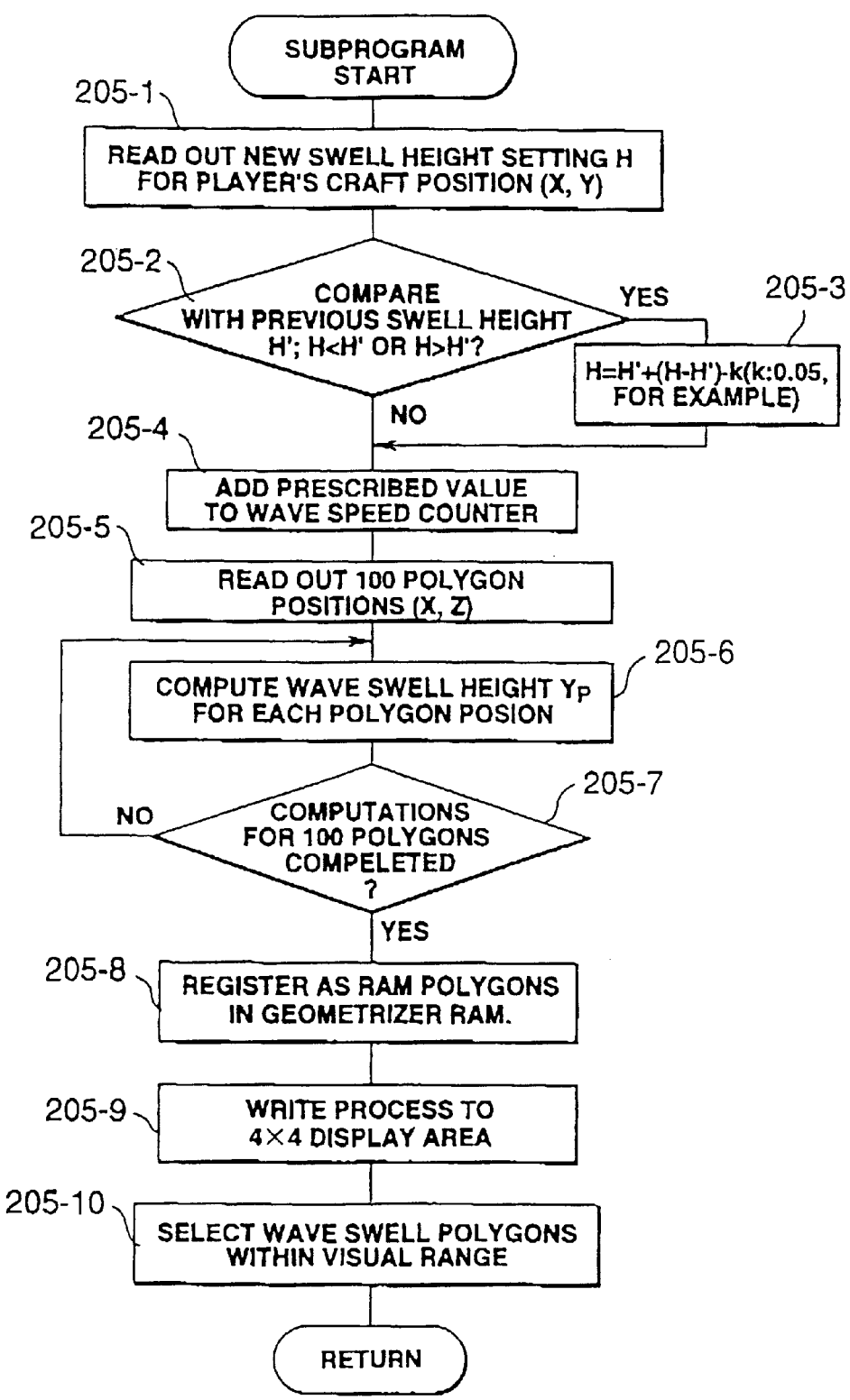
FIG. 8 is a simplified flow chart of undulating wave representation processing executed by the CPU.
Figure 9:
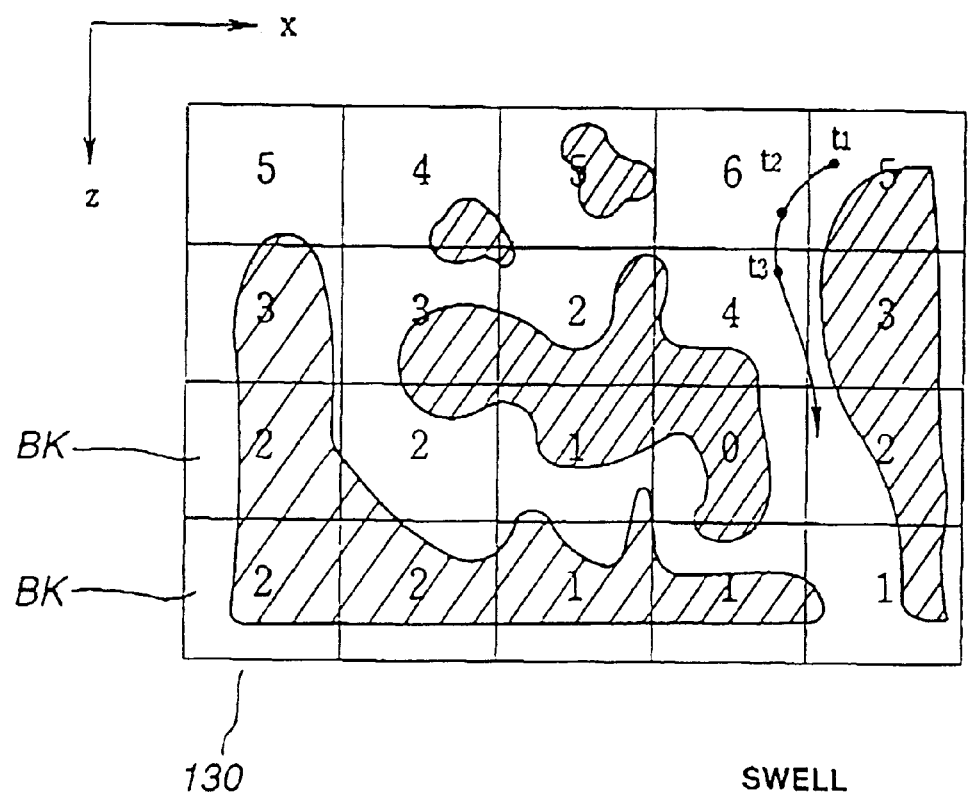
FIG. 9 is an illustrative diagram showing a model representation of a table of set values for wave swell height.
Figure 10:
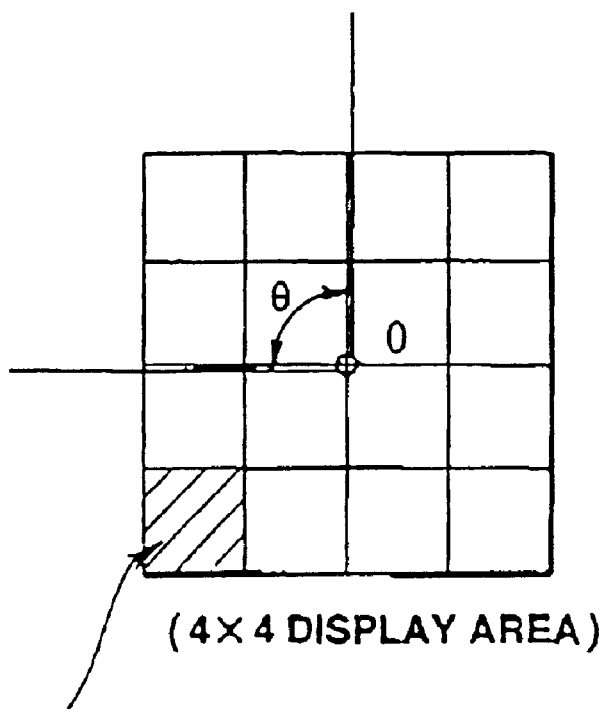
FIG. 10 is a diagram depicting the display area and visual field range.

Next, processing for representing wave swell height in step 205 will be described on the basis of FIGS. 8 through 10.

From a table stored in the ROM 102, the CPU 101 reads a set value H for the swell height of a new wave (hereinafter termed "wave swell height") corresponding to two-dimensional coordinates (x, z) representing the position of the jet-ski operated by the player (step 205-1). This swell height set value table is modeled in FIG. 9. A water surface race course 130 with specified extension corresponding to the x-z plane in the virtual three-dimensional space is established. The race course 130 is further divided into a plurality of blocks BK, and a set value for swell height H is assigned to each block BK. The areas shaded with diagonal lines in this modeled race course 130 represent land. Thus, areas between land areas are determined to be inlets, and blocks lying in these inlet areas are assigned relatively low set values for swell height. Conversely, areas determined to be open ocean are assigned high set values for swell height. When the jet-ski follows the course indicated by the arrow in FIG. 9, the position coordinates (x, z) during a certain frame time $t_1$ lie in the upper right block BK, and accordingly the set value for swell height H=0.5 m is read out. At time $t_2$, the craft moves to the neighboring block BK, whereupon H=0.6 m is read out. At time $t_3$, the craft moves to the block BK below, whereupon H=0.4 m is read out.

Next, the CPU 101 compares the set value for swell height H' during the previous interrupt (a prescribed period of time corresponding to the frame interval) with the set value for swell height H in the block currently occupied by the jet-ski during the current interrupt (step 205-2). Where the result of this comparison is H<H' or H>H', the result of the operation H'+(H–H')·k is substituted for H (step 205-3). The value of the coefficient k is about 0.05, for example. Thus, even when transition to another block results in a difference in the previous and current set value for swell height, the swell height value read out for the previous block is gradually transformed into the swell height value read out for the current block while the frame is repeated. Thus, sharp changes in set values for wave height are avoided, and changes in wave swell height from block to block can be accomplished smoothly.

Once the determination in step 205-2 is NO, or the process of the aforementioned step 205-3 has been executed, the processes of step 205-4 and subsequent steps are executed in sequence. First a predetermined constant value set for the purpose of advancing waves (creating wave motion) is added to a speed counter (step 205-4). The location (x, z) of a prescribed number (for example, 100) of polygon grids defined as constituting a single item of object data (a group of object data treated as a single object) is read out (step 205-5).

The swell height Yp at each location (x, z) of the prescribed number of polygons (e.g.: polygon center of gravity or apex locations, polygon locations as computed from current jet-ski location) is computed for all polygons using the following equation (steps 205-6, 205-7).

$$Yp = \cos(CNT \cdot 2n + (int)(x \cdot WR)) \cdot H + \sin(CNT + (int)(x \cdot WR) + CNT \cdot 2n + (int)(z \cdot WR) \cdot H \cdot c$$

Here, CNT: wave speed counter incremented by a prescribed number each frame

WR: wave rate per polygon size (20 m, for example)

x, z: x, z coordinates in three-dimensional virtual space (global coordinate system)

H: value equivalent to maximum height value (set value for current swell height)

c: coefficient for reducing wave in a prescribed direction

N: positive integer (2 n is a tiling element)

cos, sin: cos function, sin function

The wave rate is a rate (a constant, for example) used to compute wave swell cycle and height. The tiling element refers to a wave object created from a prescribed number (for example, 100) polygons; n vertical members and n horizontal members are arranged on the game screen to form the ocean surface, land, and the like.

Using the above equation, waves synthesized from sine waves and cosine waves are computed individually for each of the 100 polygons which constitute the single object data item.

The equation used to compute the swell height Yp is not limited to that given above; sine waves and cosine waves can be synthesized in a simpler fashion, or, in some cases, swell data can be computed from a sine wave or cosine wave component alone.

When swell computations have been completed, the computed swell height data for the 100 polygons is stored in the RAM 103 (step 205-8). This makes it possible for the swell height data for the 100 polygons to be used as a single object data item.

Next, the object data, specifically, swell height data for, for example, 100 polygons, is written to each of a prescribed number of display areas (for example, 4×4 object data, one object data item comprising, for example, 100 polygons) (step 205-9). By so doing, a total of 1,600 display polygons are written into a 4×4 display area, as shown in FIG. 10.

Next, a hypothetical viewpoint camera is placed, for example, at the center O of a prescribed number of display areas (4×4, for example), and polygons falling within this visual field range θ are designated (step 205-10). As a result, only polygons lying within this visual field range are displayed. Processing in this way allows the feel of a water surface, which differ from conventional stationary racing courses, backgrounds, and the like, to be represented accurately, thereby improving water game ambiance and heightening game qualities.

[Contact Determination/Processing (Step 206)]

Figure 11:
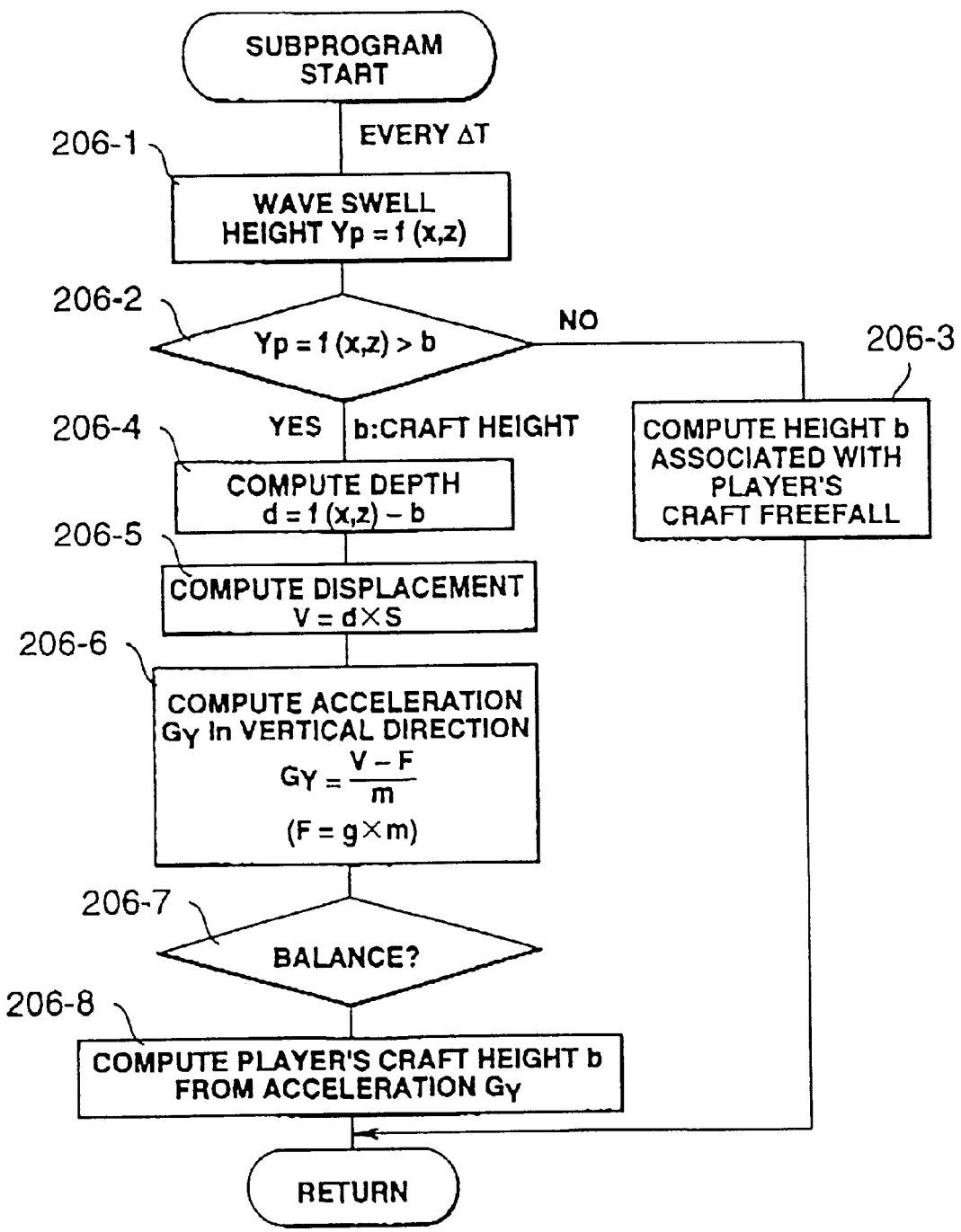
FIG. 11 is a flow chart of wave-to-watercraft contact determination executed by the CPU.
Figure 12:
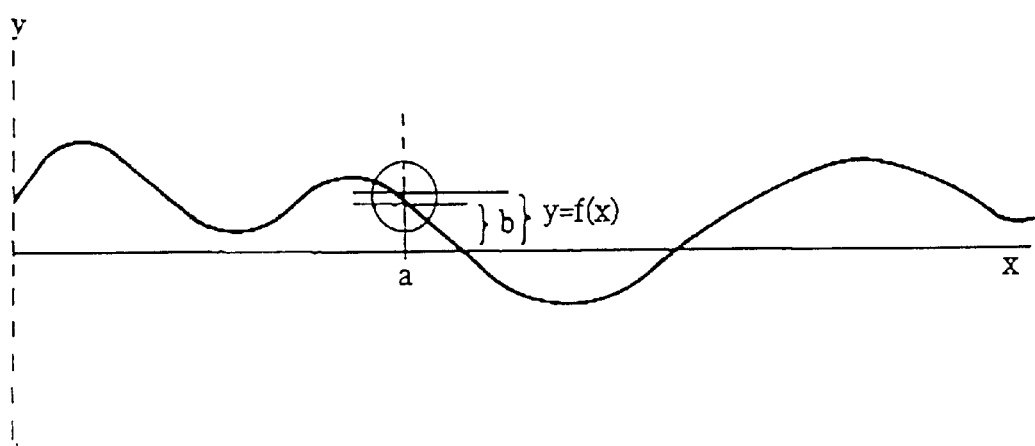
FIG. 12 is a one-dimensional illustrative diagram depicting contact determination.

Next, the process of determining contact between wave swells and the jet-ski and subsequent processing (executed in step 206 in FIG. 7) will be described on the basis of FIG. 11 and FIG. 12.

First, using the equation given earlier, the CPU 101 computes the swell height Yp=f (x, z) corresponding to the position of the jet-ski (x, z) during the current interrupt (step 206-1). FIG. 12 shows an example in one dimension x. Next, the height of the jet-ski at this point in time is designated b, and this height value b is compared to the swell height Yp=f (x, z) to determine whether Yp=f (x, z)>b (step 206-2). The jet-ski height b is, for example, the distance from the y=0 position in the world coordinate system to the position of center of gravity of the jet-ski.

If the contact determination is NO, that is, if Yp=f (x, z)≦b, the jet-ski is considered to be positioned above the wave. In this event, a free-fall equation representing gravitational acceleration g is used as the basis for computing a new jet-ski height b at which the jet-ski will contact (touch) the wave surface (step 203-6).

In contrast, when the contact determination in step 206-2 is YES, the jet-ski is considered to be contacting the wave or nosing under the water, and accordingly the separate series of processes in steps 206-4 through 8 are executed. Specifically, the submerged depth, d=f (x, z)–b, is computed (step 206-4), and the displacement, V=d·S, corresponding to the submerged depth is computed (step 206-5). S is the area of the jet-ski bottom. The acceleration in the vertical direction, Gy, produced by the buoyancy to which the jet-ski is subjected as a result of this displacement V is computed from the equation $$Gy=(V-F)/m=(V \cdot m \cdot g)/m$$

(step 206-6). Here, m represents jet-ski mass and Gy represents gravitational acceleration. Next, a new jet-ski vertical acceleration is computed by adding this acceleration Gy to the jet-ski vertical acceleration, and a new jet-ski height is computed from this new acceleration value (step 206-8). Height computations are continued until V·g and m·g reach equilibrium (step 206-7).

By means of the contact determination and subsequent jet-ski height processing described above, travel over water can be represented accurately. In contrast to contact determinations for conventional stationary racing course and backgrounds, highly accurate determinations can be made using a relatively simple algorithm, thereby further enhancing game ambiance.

Contact determinations are made on the basis of three apices on the bottom surface of the craft (the plane of projection is an isosceles triangle) and a prescribed point on the wave (the front edge or back edge of the wave, or some point in between).

[Jet-Ski Tilt Processing (Step 207)]

Figure 13:
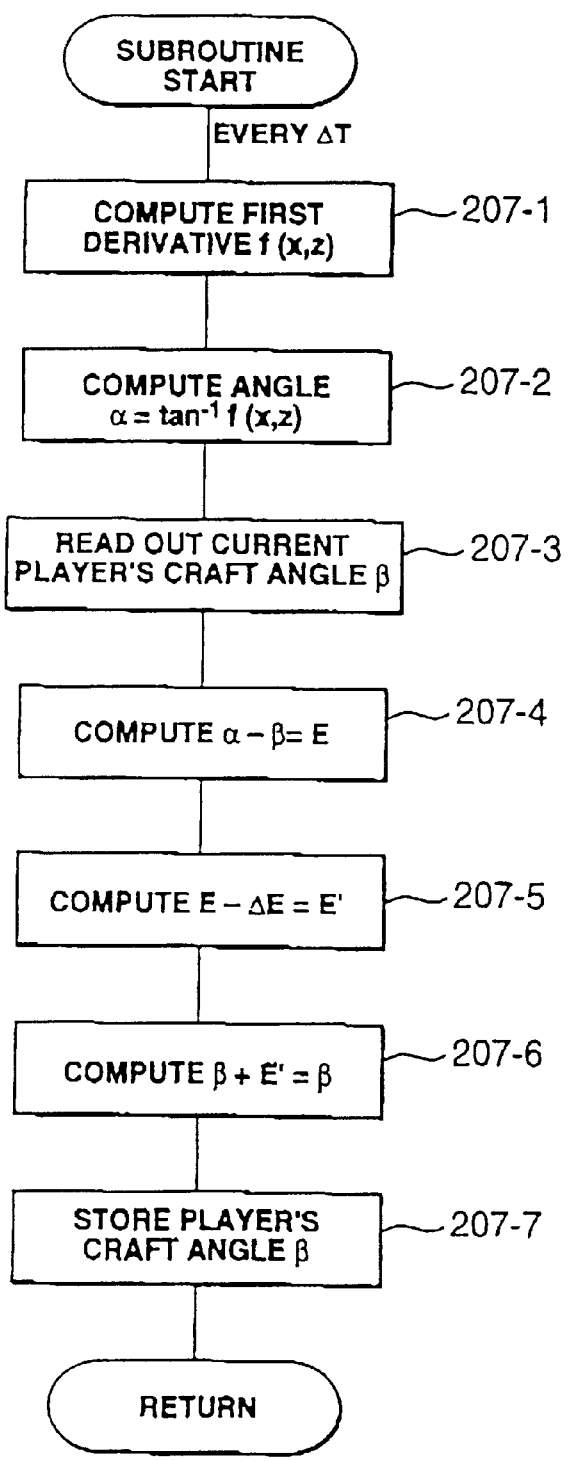
FIG. 13 is a flow chart of watercraft tilt correction executed by the CPU.
Figure 14:
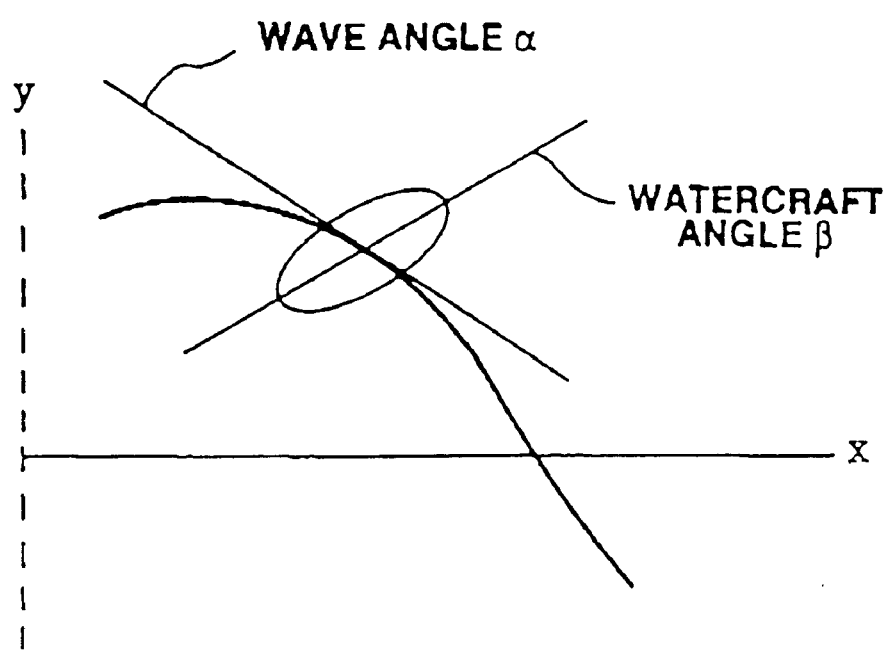
FIG. 14 is an illustrative diagram of watercraft tilt correction.

Jet ski tilt processing, executed in step 207 in FIG. 7, will be described on the basis of FIG. 13 and FIG. 14. Jet ski tilt processing is performed in response to constantly changing wave slope.

First, the CPU 101 computes the first derivative f' (x,z) of wave swell at the position (x, z) of the jet-ski during the current interrupt (step 207-1). The first derivative f' (x, z) is then used to compute a wave angle, $\alpha = \tan^{-1} f'(x, z)$ (step 207-2; see FIG. 14).

Once this is done, the previous (current) jet-ski angle β, that is, the angle formed by the axis lying in the lengthwise direction of the jet-ski (the angle (vertical angle) formed with respect to the x, z plane in the normal coordinate system (world coordinate system)) is read out from memory (step 207-3). Next, α-β=E is computed to determine an angle differential E (step 207-4). Using a predetermined infinitesimal angle, ΔE, E' =E-ΔE is computed (step 207-5). β=β+ E'is also computed, and the value β so computed is stored for use during the next interrupt (step 206-6, 7).

This process is repeated at fixed time intervals Δt shorter than the wave motion of the waves, thereby allowing the jet-ski angle β to gradually and smoothly approximate the wave angle α. As a result, unnatural angular relationships between jet-ski and wave are avoided, and the jet-ski is depicted as if constantly riding over the waves while conforming to the wave angle thereof.

[Wake Representation Processing (Step 208)]

Next, the wake representation processing executed in step 208 in FIG. 7 will be described on the basis of FIG. 15 through FIG. 19. The purpose of this is to represent as a gradually disappearing image the wake left on the water surface by a jet-ski (player's craft or other crafts) traveling over it. A wake is represented by a plurality of connected polygons. Each polygon used to form a wake is termed a wake polygon.

During the interrupt accompanying the current frame, the CPU 101 uses a flag processed previously (a previously raised flag) in order to determine whether the wake polygon display currently in processing is being elongated (step 208-1). If the determination is NO, that is, if new a wake polygon is to be drawn, the current jet-ski position and angle of travel are selected (copied) for use as the trailing edge position and angle for the wake polygon which is to be drawn (step 208-2). The current watercraft position and angle of travel are stored in memory means until the wake polygon finally disappears.

When this trailing edge processing has been completed, the new current jet-ski position and angle of travel are designated (copied) for use as the leading edge position and angle for the next wake polygon to be drawn (step 208-3).

Figure 17:
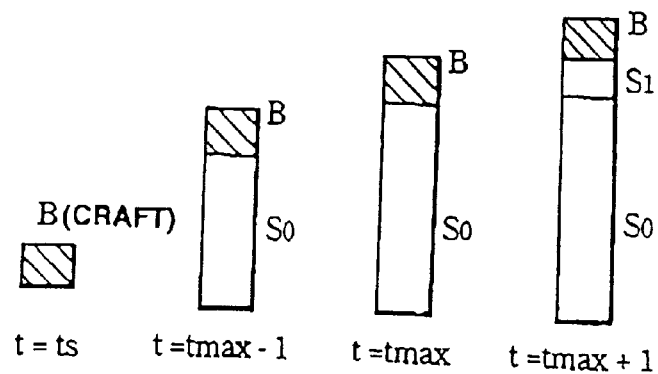
FIG. 17 is a diagram illustrating the wake polygon elongation process and conditions for its termination.
Figure 18:
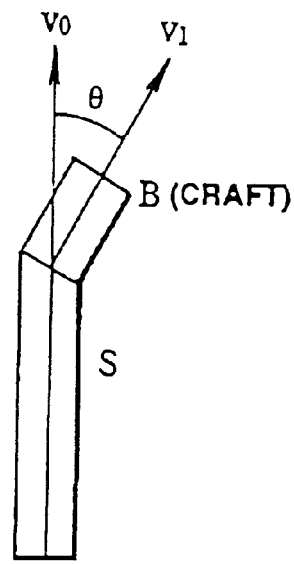
FIG. 18 is a diagram illustrating wake polygon angle conditions.
Figure 19:
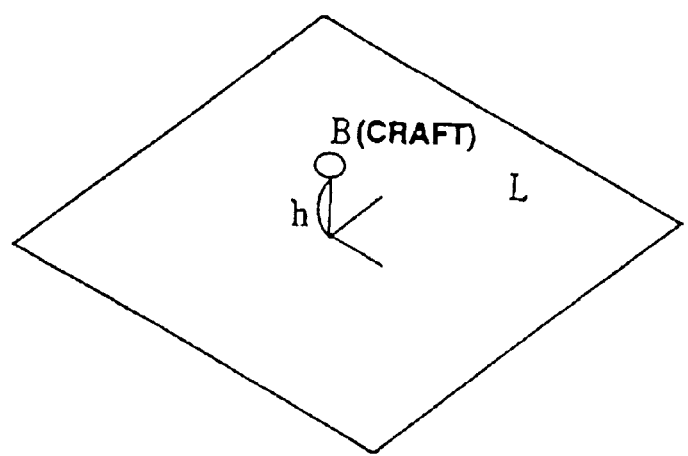
FIG. 19 is a diagram illustrating wake polygon and water surface height conditions.

Next, a determination is made as to whether conditions for terminating (stopping) wake polygon elongation exist (step 208-4). Here, these conditions are:

1) wake polygon elongation has continued for a prescribed time, or over a prescribed distance (see FIG. 17);

2) the angle between wake polygon trailing edge and leading edge has reached a prescribed angle, specifically, the angle formed by perpendicular lines (centerlines) projected from the center of the trailing edge is equal to or greater than a prescribed angle (see FIG. 18);

3) the jet ski (wake generating source) has become distanced, by an amount equivalent to a set value or more, from the space or surface L in which a wake is left (see FIG. 19).

A YES determination in step 208-4 indicates that one of these three conditions has been met, and accordingly a special determination is made as to whether the third condition of the three conditions has been met (step 208-5).

If, in the course of the two determination processes mentioned above, it is ascertained either that none of the conditions for termination has occurred (NO in step 208-4) or that a condition for termination has occurred but this condition is not the third condition pertaining to height (NO in step 208-5), a subsequent determination is made as to whether elongation has ended and if the wake polygon is being maintained (step 208-6). If this determination is NO, the wake polygon that has been elongated up to the present through the leading edge copy process in step 208-3 is maintained while suspending further elongation (step 208-7). Where a wake polygon is already maintained, the process of step 208-7 is skipped.

Next, a determination is made as to whether a prescribed period of time has elapsed since the currently held wake polygon first began to be maintained (step 208-8). If this determination is YES, it is concluded that this wake polygon is no longer needed in the display, and in order to avoid increased processing demands, reduction processing for the wake polygon is continued until complete (steps 208-9, 10). As a result, the polygon, which had been maintained at a given length up to that point in time, is allowed to shrink over successive frames until it finally disappears from the display. Specifically, the wake polygon length is gradually shortened by a shrinking it by a prescribed percentage during each frame (each ⅟60 of a second), or by some other means. This allows the impression of a gradually disappearing wake to be created.

As an alternative, the texture that has been applied to the wake polygon can be modified in such a way that the wake disappears, or the wake polygon can be subjected to translucency processing to produce the same result. Translucency processing refers to combining wake polygon color data with water surface color data to create new color data, or some similar process. By performing translucency processing during each frame, the color of the wake polygon gradually approximates the color of the water surface (field).

In the present invention, "field" refers to the water surface, but no limitation thereto is implied. For example, in video games which simulate car operation, fields include the ground, the race course, and the like. In combat games, the field refers to the background. In short, a field is a background that is paired with a wake. Accordingly, the formation of a motion trail (moving tracks, or moving trail) reflecting the movement of a particular object is not limited to representation of a wake, but finds potential application in car skid marks, as well as foot tracks.

A determination of YES in the aforementioned step 208-5 means that, for example, the jet-ski has taken a big jump off the water surface; physics dictates that no wake polygon should be produced in such a case. Accordingly, an instruction to halt wake polygon drawing is issued (step 209-11).

In this way, the data required for drawing a wake polygon processed in this way (a currently elongated wake polygon, and/or a currently maintained wake polygon (including those in reduction processing)) is provided. This data includes prescribed distances for determining two points lying in the direction of the edge at the leading edge and trailing edge of the wake polygon; a quadrangular wake polygon is defined by connecting these four points. Texture is applied to the quadrangle by the drawing device 112 in such a way that the leading edge and trailing edge patterns are connected.

Figure 15:
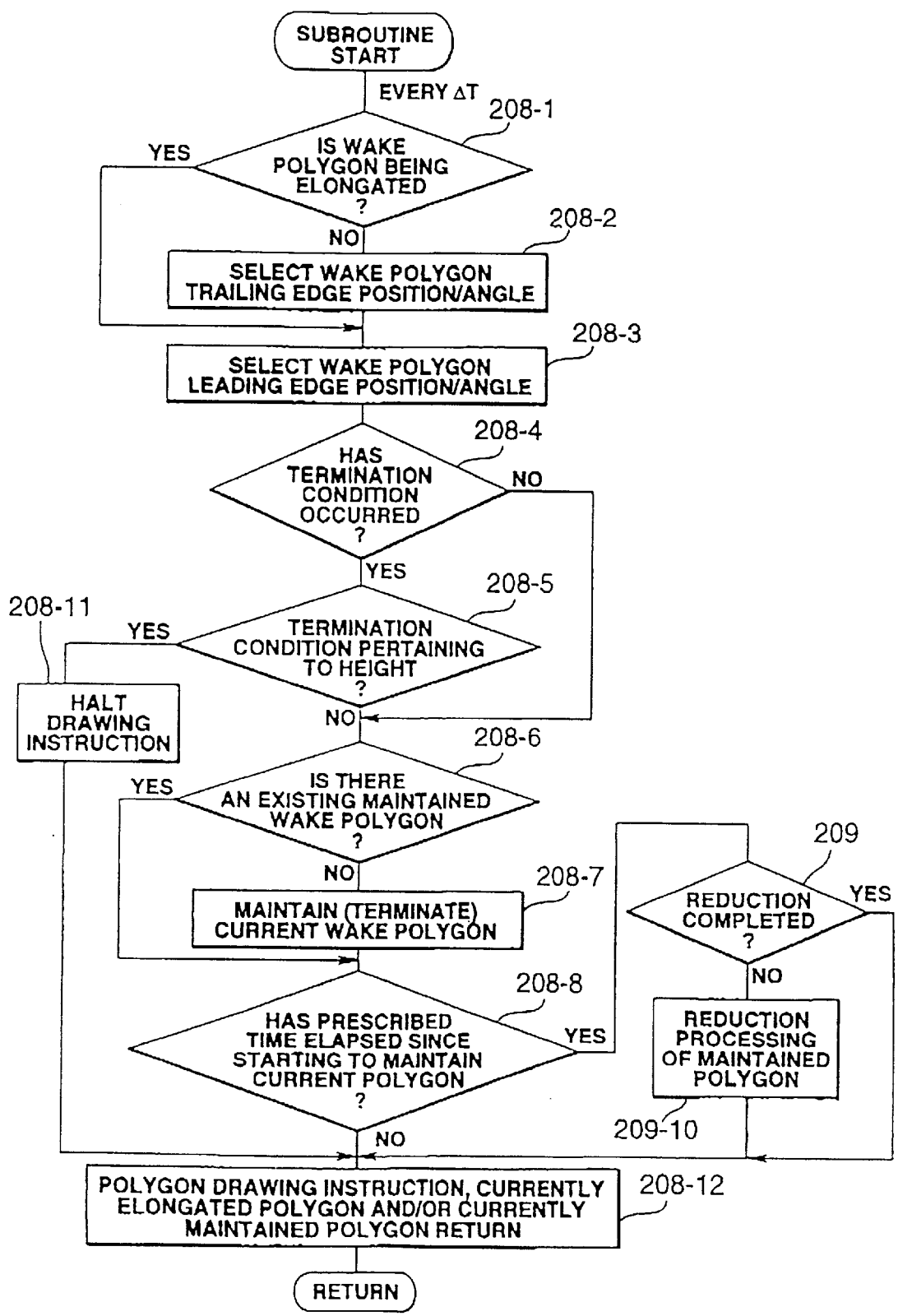
FIG. 15 is a flow chart of wake polygon drawing processing executed by the CPU.

The processing depicted in FIG. 15 is repeated during each frame. Thus, as shown in FIG. 17, when elongation of a wake polygon begins at time t=$t_s$, this same wake polygon S0 continues to be elongated until t=tmax (that is, it is redrawn in each frame so as to become elongated). At time t=tmax, elongation is terminated and elongation of the next wake polygon S1 begins. The terminated wake polygon S0 continues to be displayed for a prescribed period of time, and then shrinks beginning at the trailing edge, eventually disappearing from the screen. Similarly, termination may take place on the basis of the length of the wake polygon. Accordingly wake processing that avoids any sense of unnaturalness can be accomplished without extending the wake infinitely, even when the jet-ski is moving at high speed.

Figure 16:
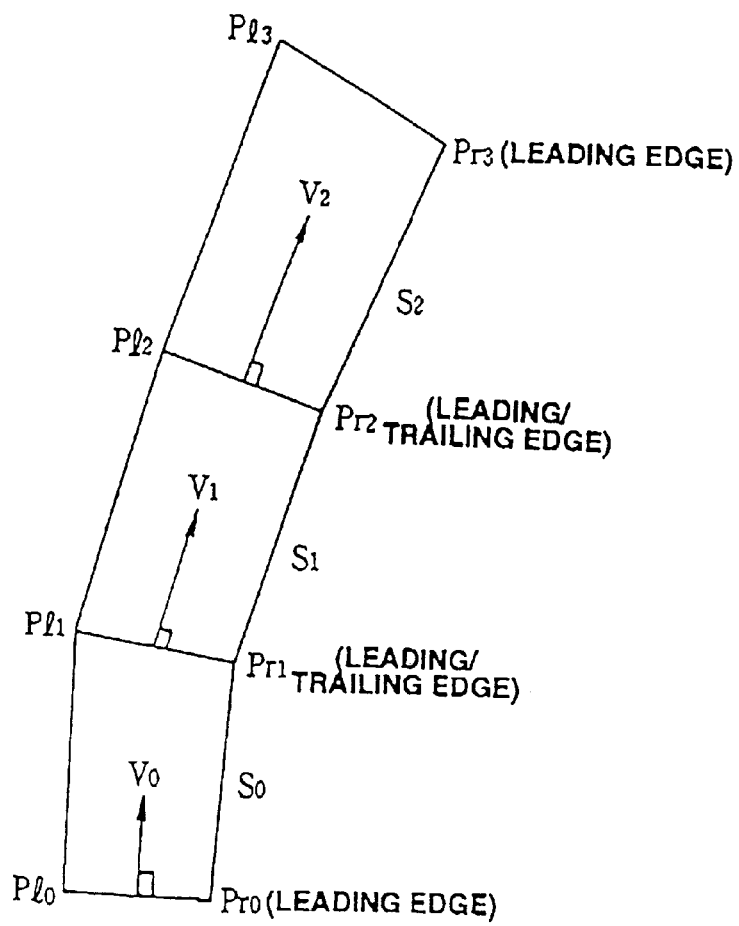
FIG. 16 is a diagram illustrating wake polygon relationships.

FIG. 16 shows three wake polygons S0 through S2 drawn contiguously. In temporal terms, S2 is the newest, followed by S1 and S0; accordingly, the oldest wake polygon S0 eventually shrinks beginning at the trailing edge as it disappears from the screen. In the same drawing, v0 is a vector indicating the trailing edge direction for wake polygon S0, v1 is a vector indicating the leading edge direction for wake polygon S0 and the trailing edge direction for wake polygon S1, and v1 is a vector indicating the leading edge direction for wake polygon S1 and the trailing edge direction for wake polygon S2. The initial wake polygon S0 is drawn as quadrangle $Pr_0$, $Pl_0$, $Pl_1$, $Pr_1$, the second wake polygon S1 as quadrangle $Pr_1$, $Pl_1$, $Pl_2$, $Pr_2$, and the third wake polygon S2 as quadrangle $Pr_2$, $Pl_2$, $Pl_3$, $Pr_3$.

As shown in FIG. 18, once the differential angle θ between the direction of advance v1 of the jet-ski B and direction v0, which indicates the angle of the trailing edge of wake polygon S0, exceeds a critical value $0_{max}$, which represents the limit to which the wake polygon can be bent during drawing, the wake polygon S is automatically terminated and a new wake polygon is created. Thus, if the jet-ski B should turn at a curvature exceeding a prescribed angle, wake polygons will be drawn in response thereto in such a way that any unnatural feel is minimized.

As shown in FIG. 19, in the event that the jet-ski B should rise above the space or plane L in which a wake should be left by a distance which exceeds a prescribed height hmax, the wake display is suspended during this time.

In this way, wake polygons are represented in such a way that they are lengthened or shortened for the player. That is, the end point coordinates of a trail polygon can be modified in accordance to travel of a moving body (or in accordance with the passage of time) and redrawn at every interrupt so that the polygon appears to expand and contract.

As the motion tracks are deleted gradually, stage effect of games is improving without preventing player's view sight.
[Processing for Rocking Cage (Step 209)]

Next, the processing used for rocking the cage 1, executed in step 209 in FIG. 7, will be described.

In this embodiment, jet-ski contact determination/processing is executed in step 206 in the same drawing, and during this step the current height b of the jet-ski is computed at fixed time intervals Δt. This height b is controlled in response to wave swell height. In step 207 in the same drawing, tilt of the jet-ski is computed as well, and this tilt is also linked to wave swell height.

Accordingly, when the CPU 101 reaches step 209, electrical pressure control signals corresponding to the jet-ski height b and tilt that have been computed at this point in time are generated, and these signals are delivered to the electrical pressure control device 25 of the cage 1.

As a result, the electrical pressure control device 25 adjusts the pressure in all of the vertical pressure chambers of the center cylinder 12, thereby extending or retracting the center cylinder 12 stroke so that the cage 1, and specifically the saddle 20, rocks in the pitching direction in the manner depicted in FIGS. 4 and 5.

This rocking processing is performed at fixed time intervals Δt. Wave swell height, on the other hand, is processed on an individual and independent basis. That is, the element of wave swell height is reflected in rocking processing for the saddle 20 when necessary.

As a result, even when the jet-ski is not moving, the wave swell height fluctuates in accordance with a wave synthesized from a sine wave and a cosine wave, and accordingly the saddle 20 rocks slightly, creating the impression that the player is riding on a watercraft which is sitting in the water. Since swell height and angle change as the craft moves, motion of the saddle 20 in the pitching direction is controlled to within a pitching range and speed in accordance with these values. This creates an impression of wave size and speed for the player, enhancing the realism of the game.
[Processing for Display of Objects Submerged in the Water (Step 210)]

Figure 20:
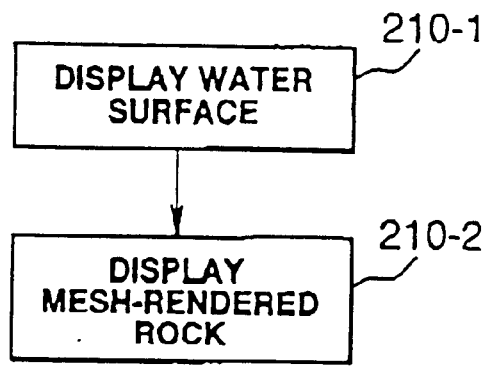
FIG. 20 is a partial flow chart depicting processing for representation of a rock partially submerged in the water.
Figure 21:
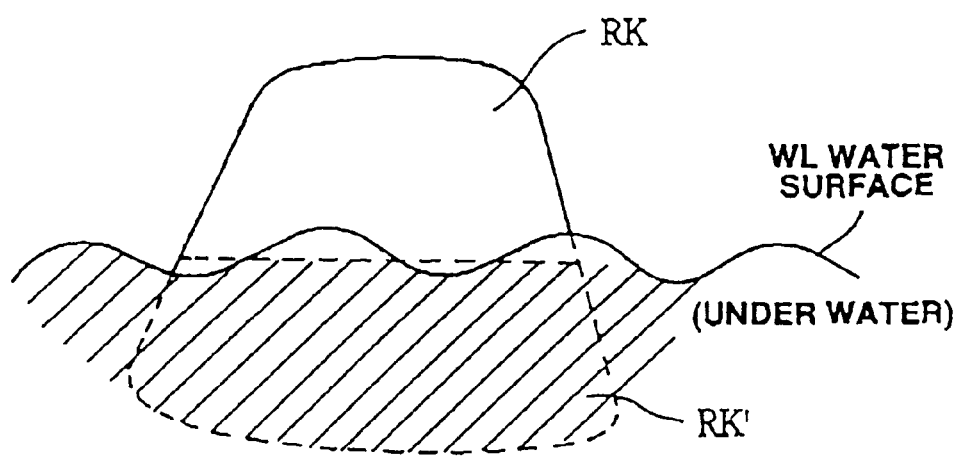
FIG. 21 is a diagram illustrating processing for a display of a rock partially submerged in the water.

In step 210 in FIG. 7, during the shape data (polygon data) processing which accompanies jet-ski movement, polygon data processing for displaying objects submerged in the water is conducted in the manner shown in FIGS. 20 and 21.

The CPU 101 first draws a polygon representing the water surface WL (step 210-1 in FIG. 20). Next, rock RK polygons, for example, are drawn thereon (step 212-1). During drawing of a rock RK, that portion RK' of the rock RK whose computed coordinates lie under the water is rendered in a color indicating submersion (such as a brown-tinged blue color) and is subjected to mesh treatment in advance.

By creating rock polygons modeled in advance in the manner described above, modeled rocks can simply be drawn as polygons without using a Z buffer, thereby allowing partially submerged rocks to be represented easily. Thus, even when using a data processing section (board) that is not equipped with translucent display functionality, such displays can be made easily and with relatively light processing demands compared to a Z buffer, which represents a significant advantage. Specifically, since objects submerged in the water are rendered before the water surface is, the task of sorting in a Z sort can be avoided.

In the embodiment described above, a configuration adapted to a jet-ski, motor boat, or other watercraft was described. However, the invention is not limited to these, and may be adapted to water games, aviation games, and the like as well. In this case, water flow within the water or an air stream in the sky would serve as the temporally and spatially shifting field.

In the foregoing description, the ROM depicted in FIG. 3 corresponds to the recording medium which stores the application software.
[Description of Second Embodiment of Craft Simulator]

Figure 22:
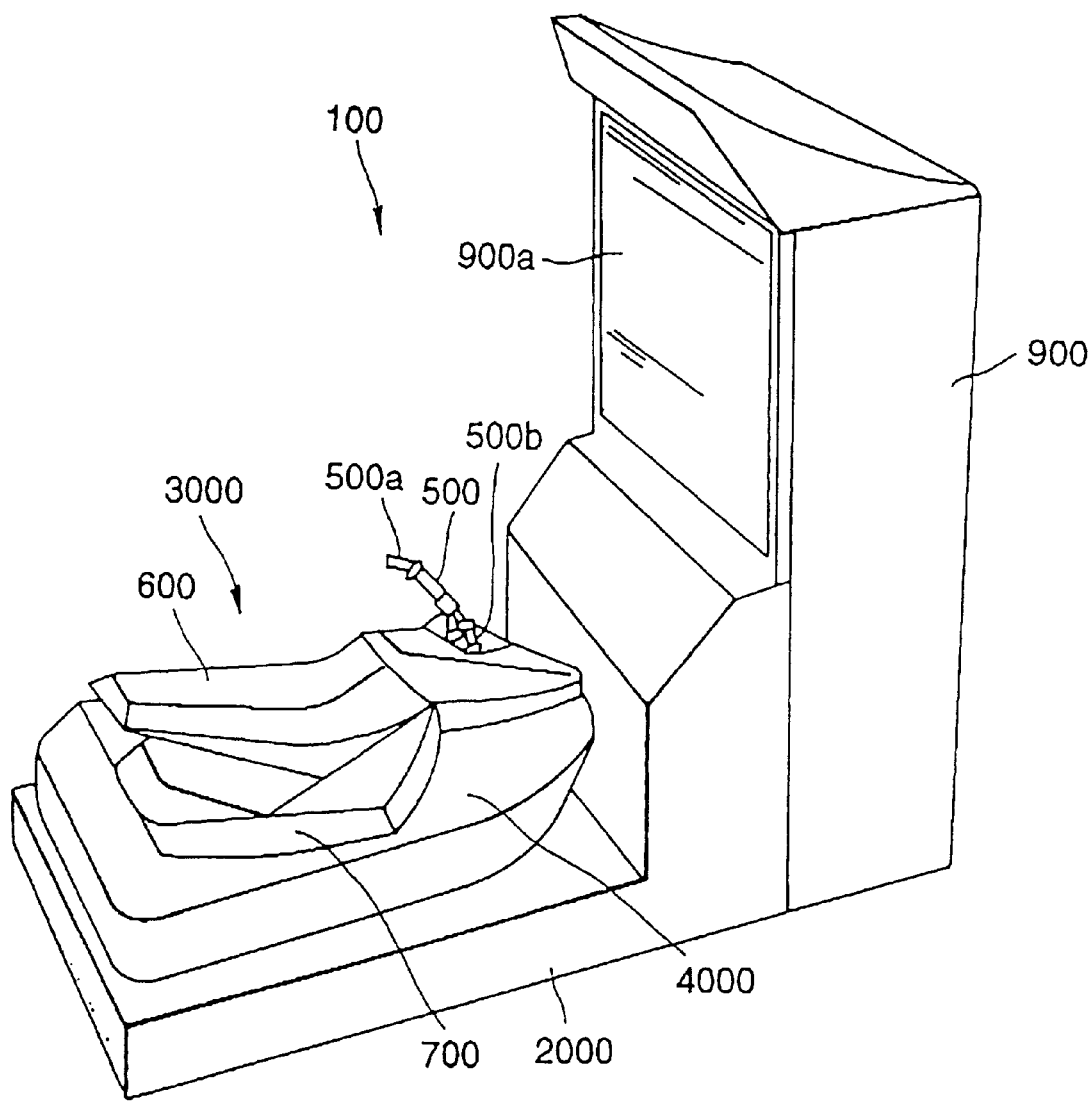
FIG. 22 is an external view of the entire craft simulator pertaining to the second embodiment of the present invention.

Referring next to FIGS. 22 thorough 32, the design of a second embodiment of a craft simulator constituted so as to exchange prescribed control signals with the image processing of the present invention and to produce movements identical to those of a character displayed on the screen (such as a jet-ski) will be described.

FIG. 22 is an external view of an entire craft simulator 100. A jet-ski body 3000 modeled on a jet-ski is rockably supported on a flat stand 2000. A television monitor 900 is disposed to the front of the jet-ski body 3000. The screen 900a of the television monitor 900 is a large screen forming a vertical plane located directly in front of the player riding the jet-ski body 3.

The craft body cover 4000 of the craft body 3000 is elongated in the front-to-back direction. A rod-shaped steering handle 500 is disposed at the front of the craft body, and a steering angle sensor 1000 for sensing the steering angle is provided to the steering shaft. One of the grips 500a and 500b disposed at the left and right ends of the steering handle affords acceleration control and is provided with an acceleration control sensor 100 for sensing the angle of rotation.

A seat 600 which is elongated in the front-to-back direction is disposed to the rear of the steering handle 500. The player sits astride the seat 600, placing the feet on footrests 700 located on the left and right sides.

The craft body 3000 incorporates a frame 220 of substantial lateral width integrally linked by means of cross members 210 to a main frame 200 comprising two members that extend parallel in the front-to-back direction. The frames 200 and 220 are covered by the craft body cover 4000. A pair of left and right bearing plates 250 project upward from the center at the front end of the stand 2000, below the front ends of the main frame 200. A support shaft 260 is suspended between the two, and a crank member 270 is pivotally supported at its top edge by the support shaft.

A support plate 280 which projects upward to the rear of the bearing plates 250 on the stand 2000 supports via a spherical bearing 290 the back end of a front air cylinder 300 which extends in the forward direction. The distal end of a retractable rod 300a which projects forward from the front air cylinder 300 is supported by the aforementioned crank member 270 via a pin 310.

At the front end of the main frame 200, a front end bracket 230 projects downward. The lower end of the front end bracket 230 and the front end of the aforementioned crank member 270 are linked via a spherical bearing 320.

Figure 23:
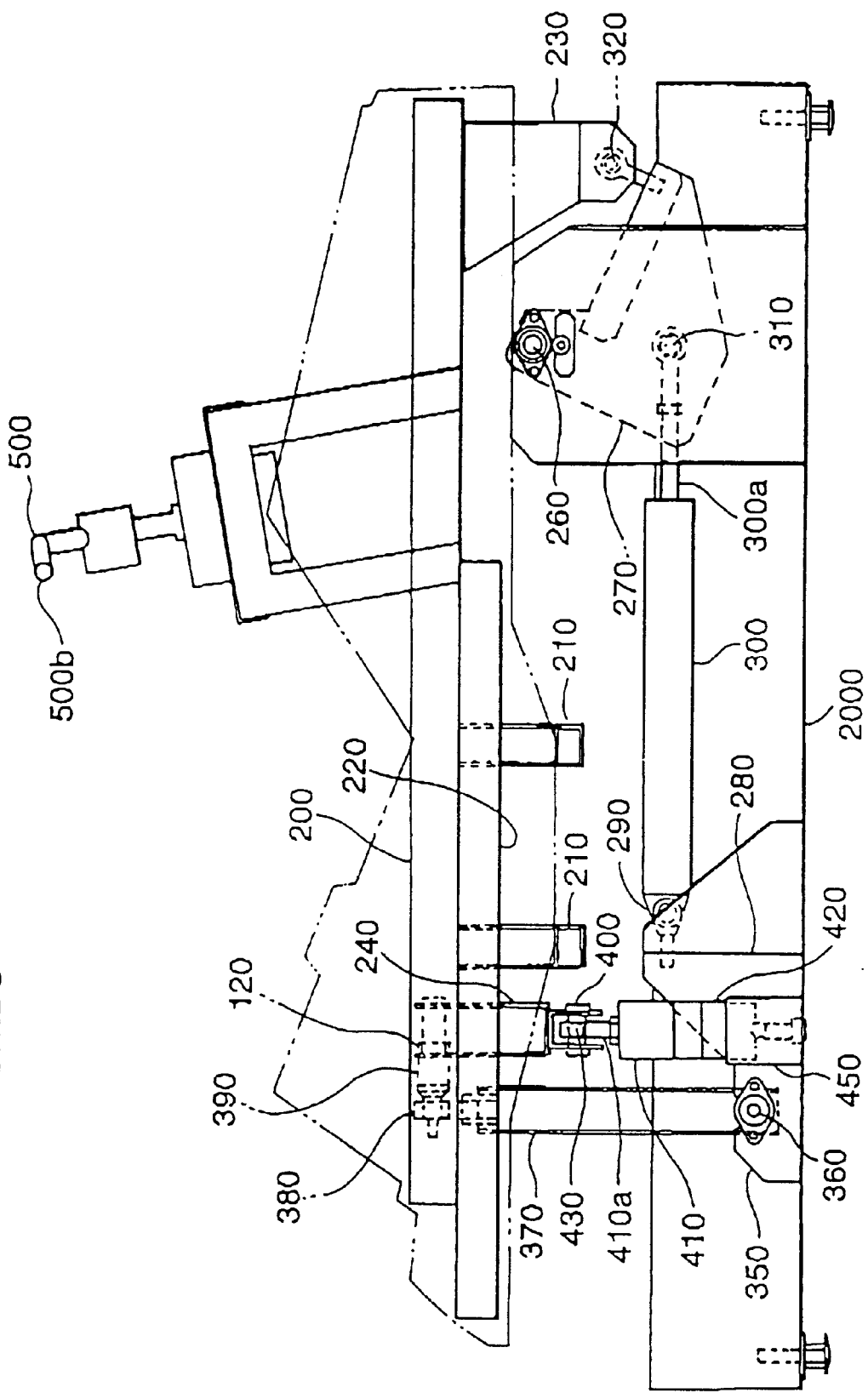
FIG. 23 is a simplified side view of principal components showing the rocking mechanism of the watercraft.
Figure 24:
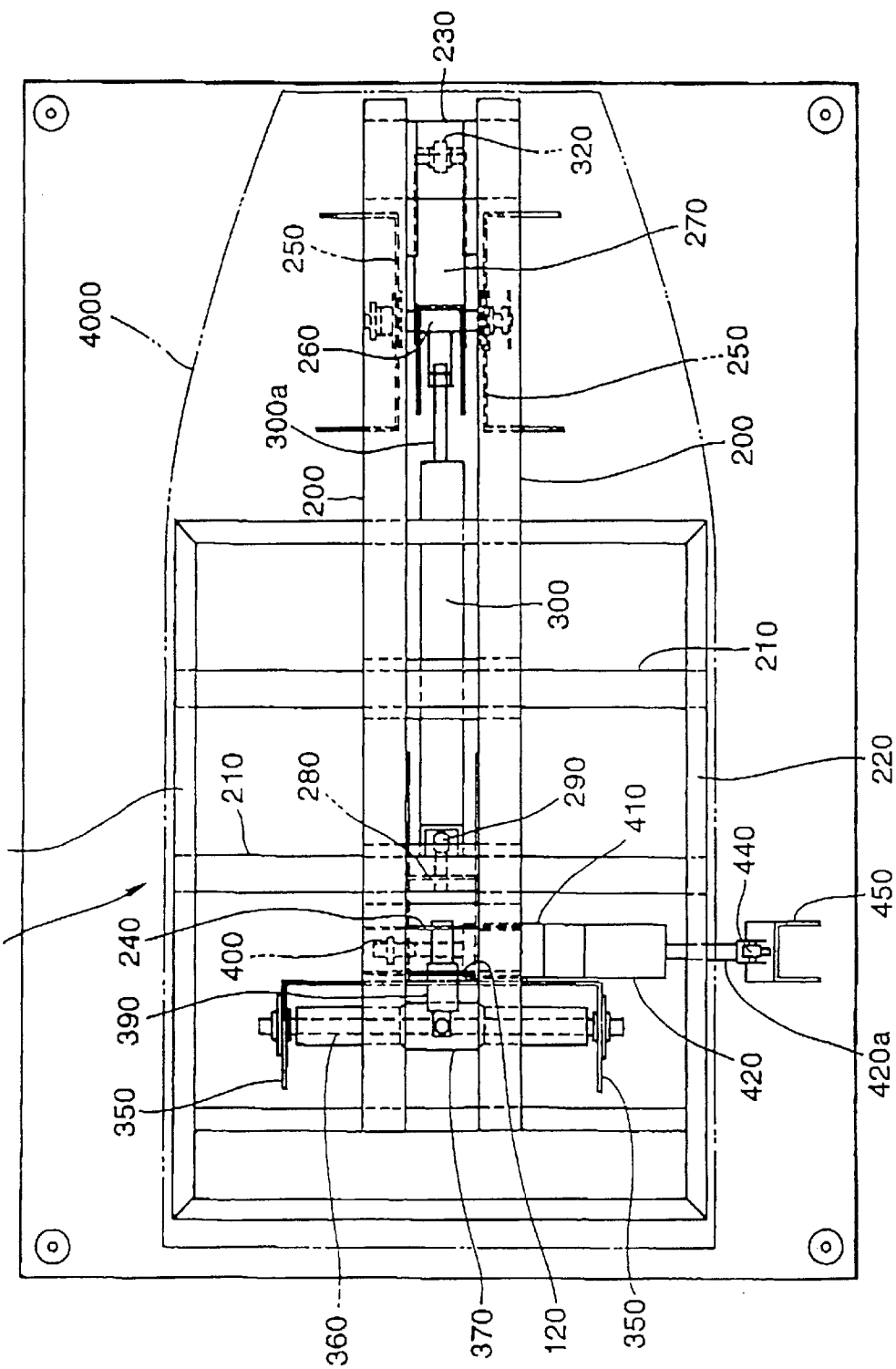
FIG. 24 is a plan view thereof.
Figure 26:
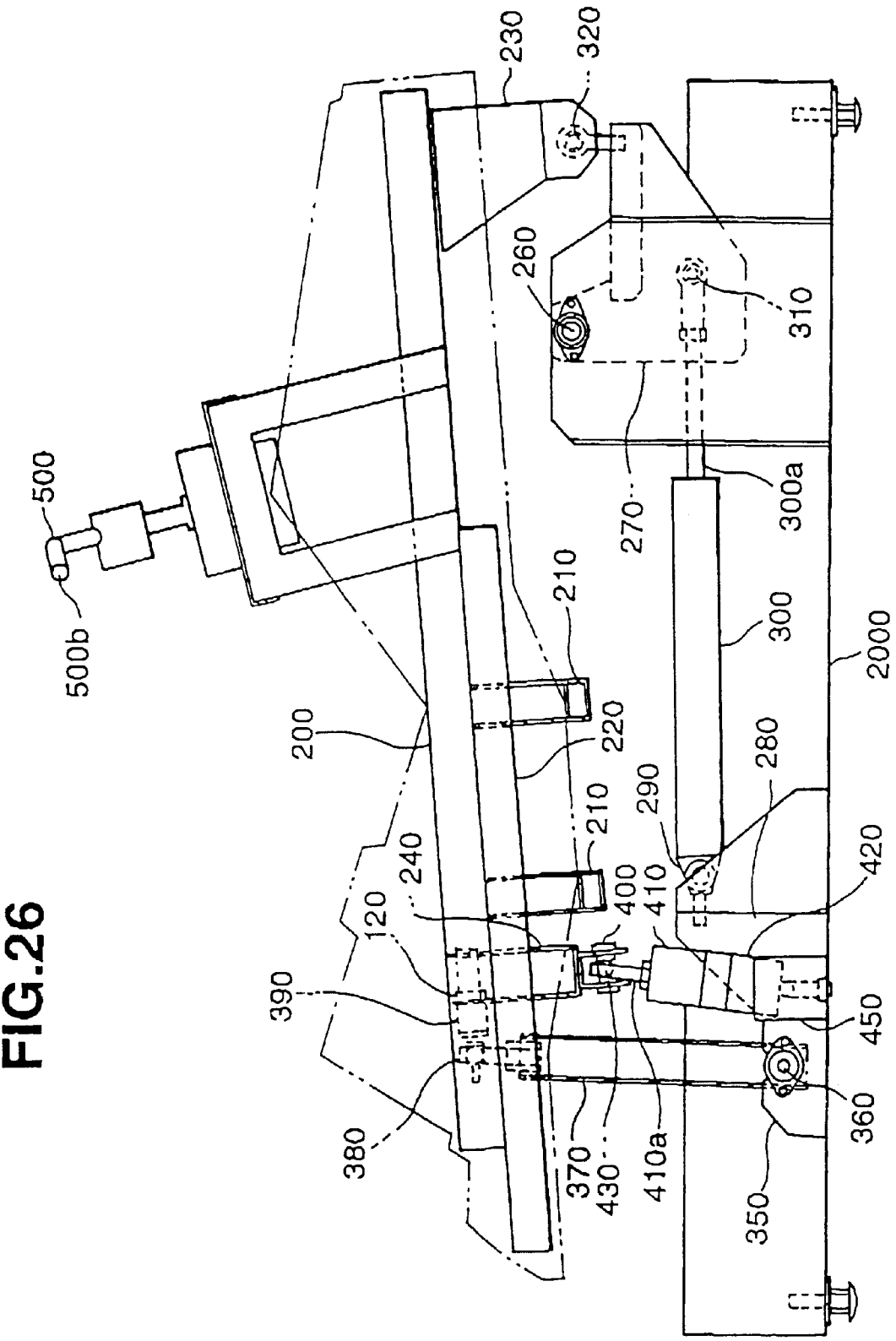
FIG. 26 is a side view of principal components in another attitude.

Accordingly, when the rod 300a of the front air cylinder 300 is extended or retracted, the crank member 270 swivels, allowing the main frame 200 to be rocked vertically via the front end bracket 230 (see FIG. 23 and FIG. 26). The front air cylinder 300 comprises two serially linked cylinders (front and rear) which share the rod 300a.

At the back end of the stand 2, a support shaft 360 is suspended between a pair of left and right bearing plates 350 which project upward, and a rocking motion support member 370 capable of rocking forward and backward is pivotally supported at its bottom end by the support shaft 360 so as to extend upward. A spherical bearing 380 projects from the top end of the rocking motion support member 370. A support shaft 390 projects rearward from the center top of the a back end bracket 240 the projects downward at the back end of the main frame 200. This support shaft 390 is linked to the aforementioned spherical bearing 380.

The back end of the main frame 200 is supported on the rocking motion support member 370 via the spherical bearing 380 and support shaft 390. The main frame 200 is permitted to move forward and backward by the rocking motion support member 370 and tilt to the left and right, centered on the support shaft 390.

Figure 25:
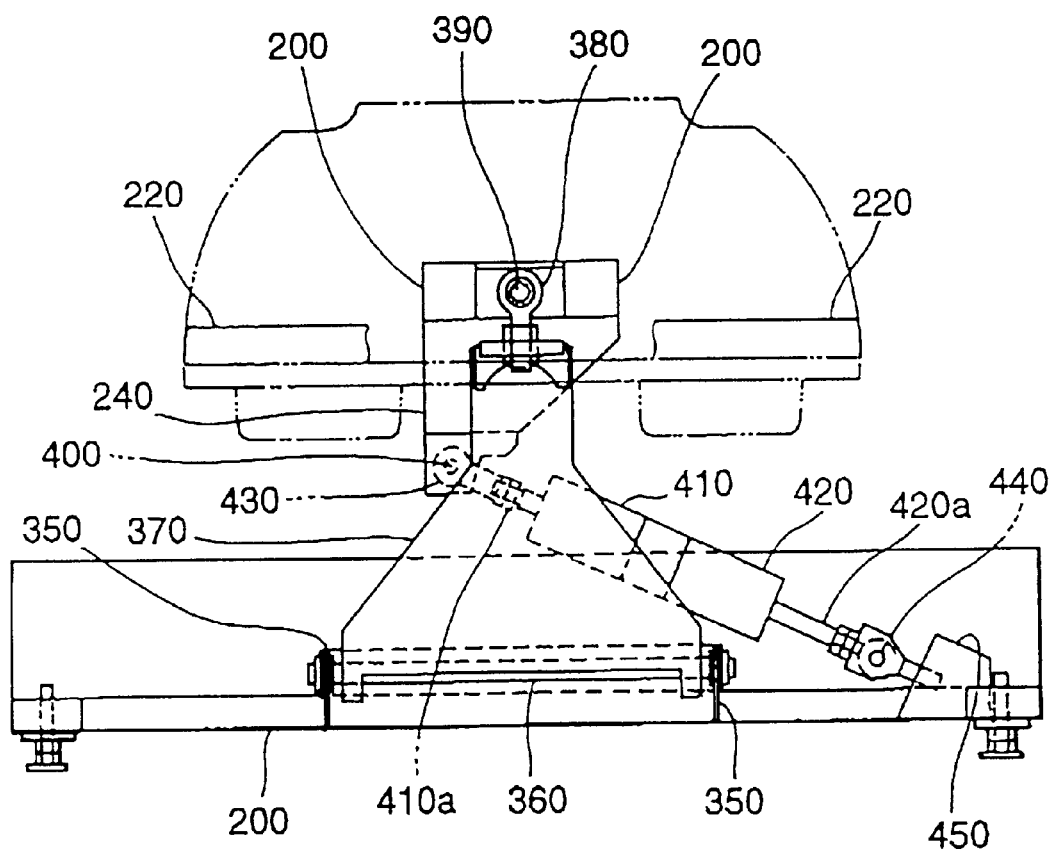
FIG. 25 is a rear view thereof.

The aforementioned back end bracket 240 projects downward toward the left side, as shown in FIG. 25, and a support shaft 400 is provided to its bottom end. Two serially linked rear air cylinders 410 and 420 mated back-to-back are disposed below the rear bracket 240. The distal end of the rod 410a of one rear air cylinder 410 is linked to the aforementioned support shaft 400 via a spherical bearing 430, and the distal end of the rod 420a of the other rear air cylinder 420 is supported via a spherical bearing 440 in a bracket 450 located in proximity to the right edge of the stand 2000.

Thus, the rear air cylinders 410 and 420 are disposed in the inclined attitude shown in FIG. 25 by means of linking the distal end of the upper rod 410a to the spherical bearing 430 which is offset to the left of the rear bracket 240 integrated with the main frame, and by linking the distal end of the lower rod 420a to the spherical bearing 440 which projects from the bracket 450 located in proximity to the right edge of the stand 2.

Figure 27:
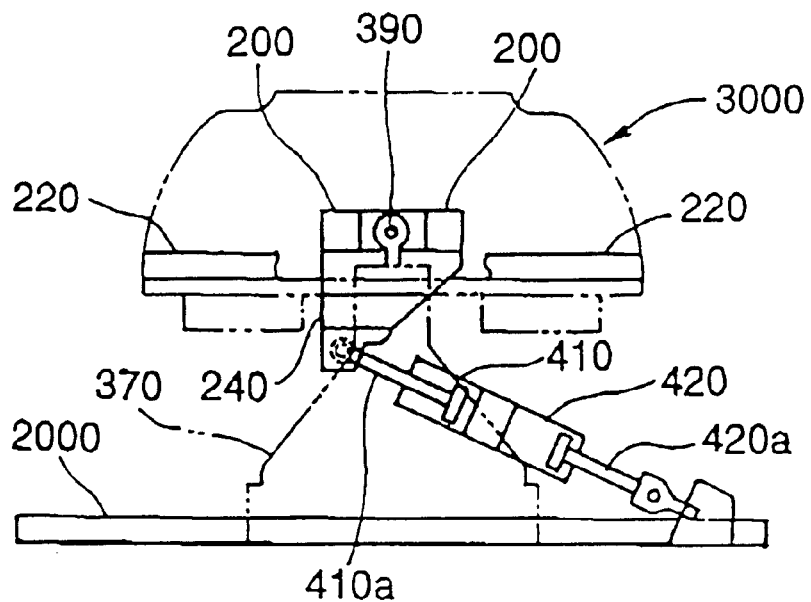
FIG. 27 is a rear view of principal components with the watercraft in a horizontal attitude.

When the craft body 3000 is in the laterally horizontal attitude shown in FIG. 25 and FIG. 27, the disposition of the serially linked rear air cylinders 410 and 420 is such that the rod 410a of the rear air cylinder 410 is contracted and the rod 420a of the rear air cylinder 420 is extended.

Figure 28:
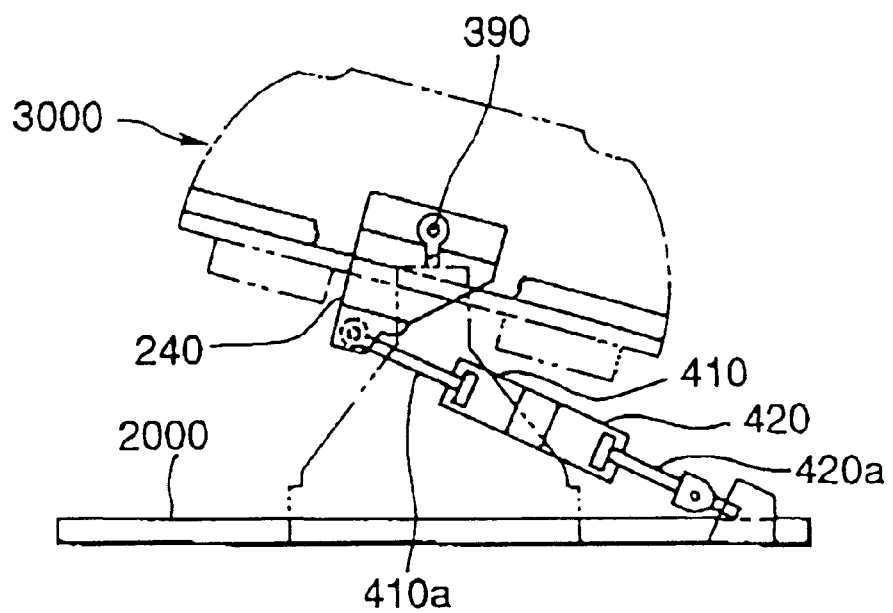
FIG. 28 is a rear view of principal components with the watercraft tilted to the right.

When the right side of the frames 200 and 220 is lowered into the right-inclined attitude shown in FIG. 28, the retracted rod 410a of the rear air cylinder 410 extends so that both rear air cylinders 410 and 420 are extended.

Figure 29:
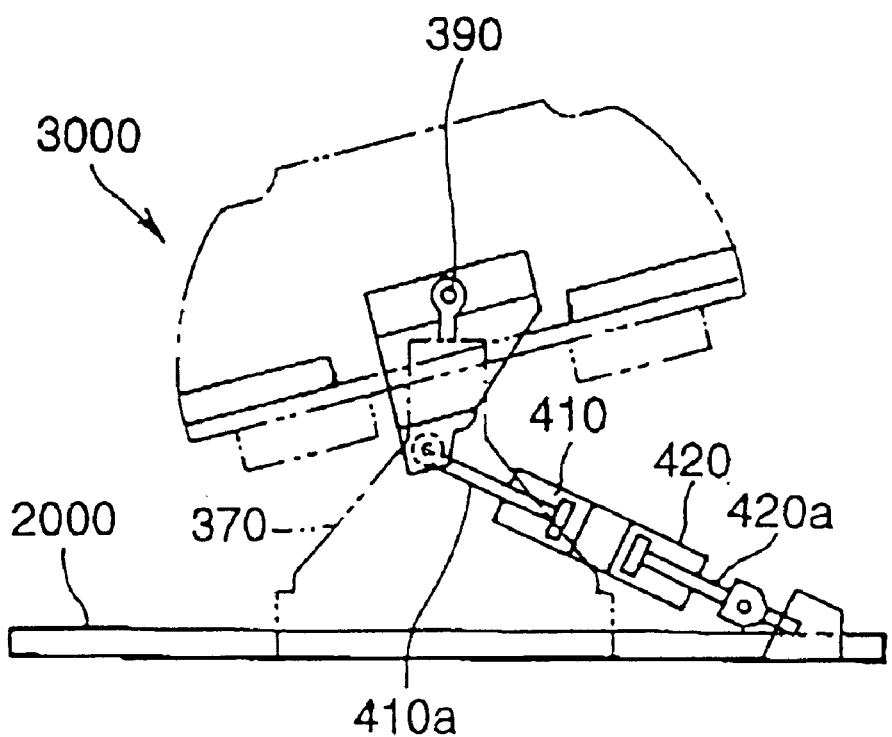
FIG. 29 is a rear view of principal components with the watercraft tilted to the left.
Figure 30:
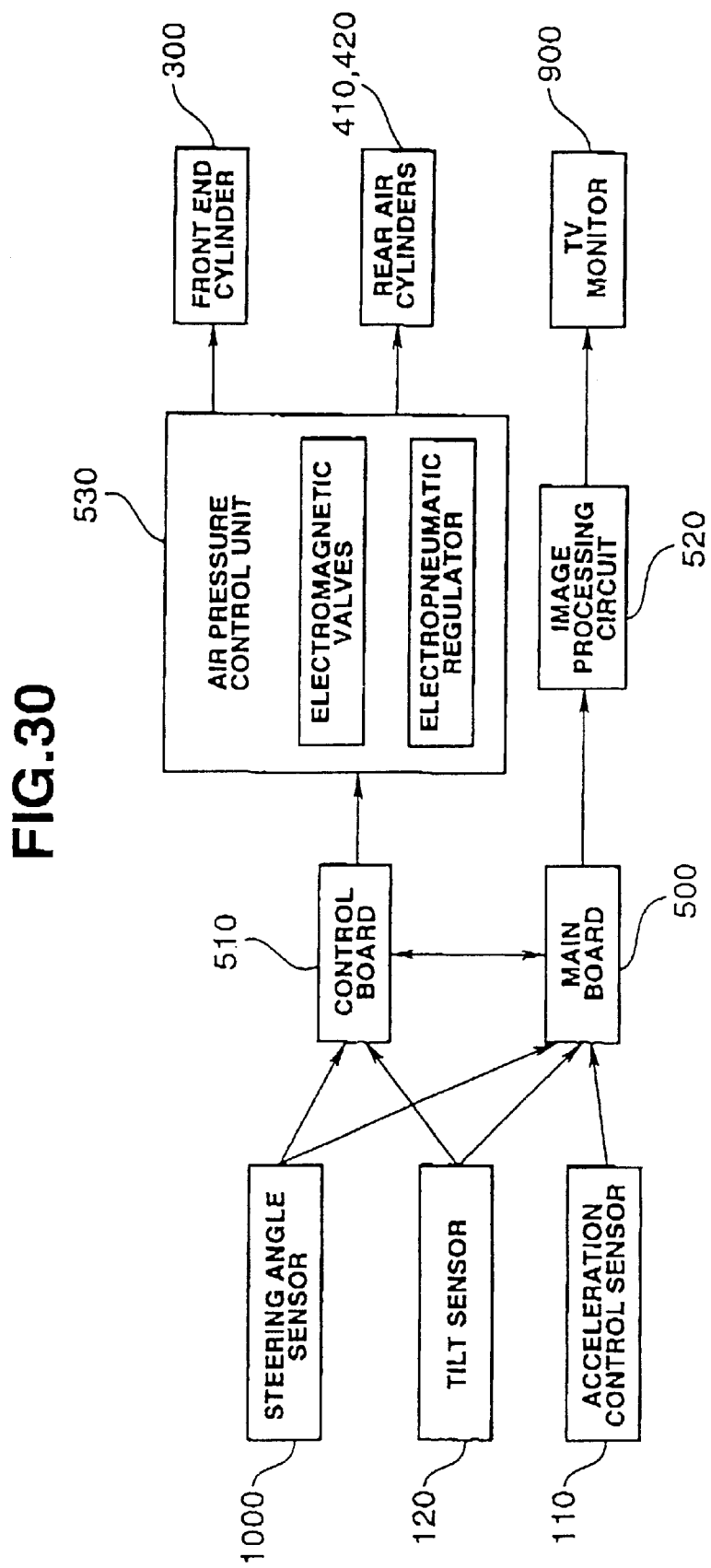
FIG. 30 is a simplified block diagram of the control system.

Conversely, when the left side of the frames 200 and 220 is lowered into the left-inclined attitude shown in FIG. 29, the extended rod 420a of the rear air cylinder 420 retracts so that both the rear air cylinders 410 and 420 are retracted.

The pressure applied to both rear air cylinders 410 and 420 by an electropneumatic regulator (electrical pressure control device), which controls air pressure by means of electrical signals, can be varied. High pressure makes it difficult for the rods 410a and 420a to be extended or retracted by external force; conversely, low pressure allows the rods 410a and 420a to be readily extended or retracted.

When a player sitting on the craft body 3000 shifts his or her weight in the lateral direction, the craft body 3000 will tilt more easily the lower the pressure. Tilt of the craft body 3000 to the left or right is sensed by the tilt sensor 120.

As noted above, the craft body 3000 can be tilted through shifting the rider's body weight, and naturally is it also possible to actively operate the rear air cylinders 410 and 420 in order to forcibly rock the craft body 3000.

A schematic block diagram of the control system for a craft simulator 100 like that described above is presented in FIG. 30. A main board 500 which generally controls the entire craft simulator 100 advances the game, while a control board 510 controls the drive of the aforementioned front air cylinder 300 and rear air cylinders 410 and 420.

Sensor signals from the aforementioned steering angle sensor 1000, acceleration control sensor 110, tilt sensor 120, and the like are input to the main board 500, while sensor signals from the steering angle sensor 1000 and tilt sensor 120 are input separately and directly to a control board 510. Instruction signals for rocking the craft body 3000 are output from the main board 500 to the control board 510 as the game proceeds; conversely, control status signals for the craft body 3000 are output from the control board 510 to the main board 500.

Since the craft simulator 100 is modeled after a jet-ski, an ocean scene is shown as a image on the television monitor 900, making it possible to provide the player riding on the craft body 3000 with the impression of actually riding a jet-ski over the ocean when the image is viewed.

As the game proceeds, the main board 500 outputs image instruction signals to an image processing device 520. The image processing device 520 processes the image instruction signals outputs image signals to the television monitor 900 so that the images are shown.

The control board 510, on the other hand, inputs sensor signals from the steering angle sensor 100 and tilt sensor 120, as well as instruction signals from the main board 500, and controls the various electromagnetic valves of the pneumatic circuit 530, the electropneumatic regulator, and the like to drive the front air cylinder 300 and the rear air cylinders 410 and 420.

Figure 31:
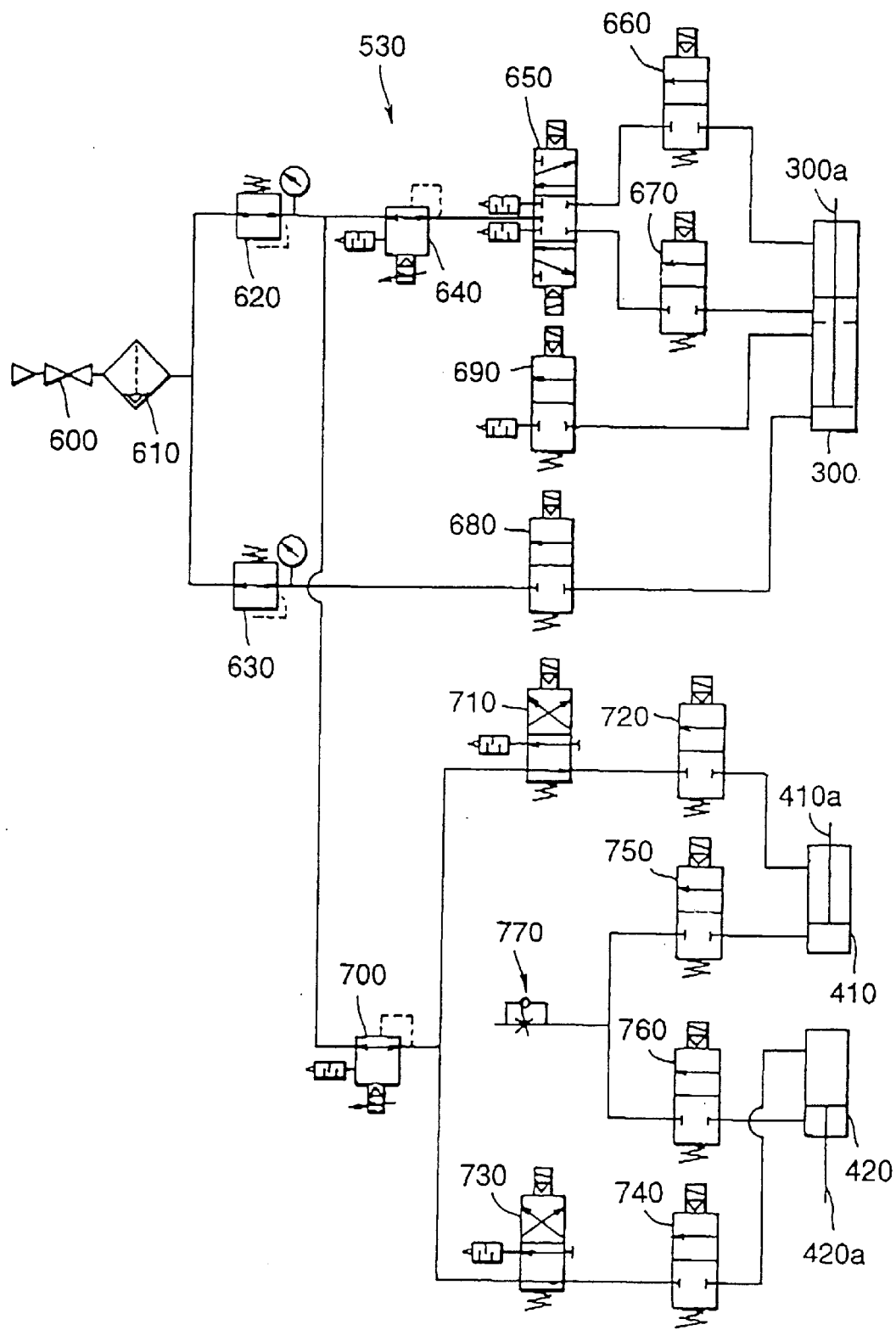
FIG. 31 is an illustrative diagram showing cylinder air pressure control.

The pneumatic circuit 530 is depicted in FIG. 31. Air pressure is lowered through pressure reducing valves 620 and 630 via a stop valve 600 and a filter 610. One pressure reducing valve 620 is connected to electropneumatic regulators 640 and 700 via two branched routes.

One electropneumatic regulator 640 is connected to one port of a five-port, three-position change-over valve 650. Two other ports of the five-port, three-position change-over valve 650 are connected to a muffler, and each of the other two ports is connected to a port of a two-port, two-position change-over valve 660 and 670. The other ports of the two-port, two-position change-over valves 660 and 670 are connected respectively to the two ports of the front cylinder of the aforementioned front air cylinder 300.

The aforementioned pressure reducing valve 630 is connected to the head-side port of the rear cylinder of the front air cylinder 300 via a two-port, two-position change-over valve 680. The rod-side port of the rear cylinder is connected to another two-port, two-position change-over valve 690.

As noted earlier, the front air cylinder 300 comprises two (front and rear) cylinders with a common rod 300a. The rear cylinder is constantly maintained at the extended side through the application of constant pressure via the two-port, two-position change-over valves 680 and 690, thereby providing equilibrium with force acting in the retraction direction produced by the weight of the rider on the craft body 3000. Accordingly, the craft body 3000 is kept stable and an air spring action is produced, making it possible to use low air pressure to drive the other cylinders to rock the craft body 3000.

Air pressure regulated by the electropneumatic regulator 640 is applied to the two ports of the front cylinder via two-port, two-position change-over valves 660 and 670 under switching control by the five-port, three-position change-over valve 650, thereby making it possible to control the stroke position and speed of motion of the rod 300a.

The electropneumatic regulator 700 located on the other route branching off from the aforementioned pressure reducing valve 620 is connected via a four-port, two-position change-over valve 710 and a two-port, two-position change-over valve 720 to the rod-side port of one cylinder 410 of the rear air cylinders 410 and 420, as well as in parallel to the rod-side port of the other cylinder 420 via a four-port, two-position change-over valve 730 and a two-port, two-position change-over valve 740.

The head-side ports of the cylinders 410 and 420 are connected respectively to a two-port, two-position change-over valves 750 and 760; the other ports of the two two-position change-over valves 750 and 760 merge into a single line connected to a flow regulating valve 770.

In contrast to the front air cylinder 300, the rear air cylinders 410 and 420 do not have a common rod, but constitute independent cylinders 410 and 420 each having its own rod 410a and 420a. Pressure control is performed by a separate electropneumatic regulator 700.

Figure 32:
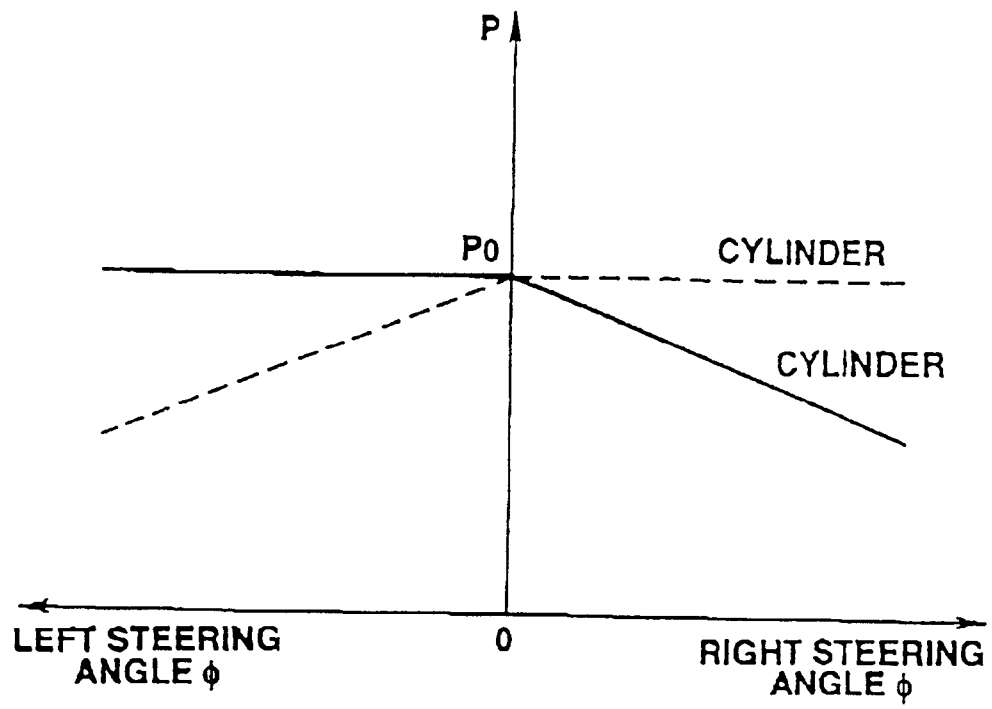
FIG. 32 is an illustrative diagram showing the relation between the slope and the speeds.

Assuming the craft body 3000 to be in the horizontal attitude depicted in FIG. 27 and traveling at a speed produced by a certain acceleration control, the air pressure P is controlled in accordance with steering angle φ in the manner shown in FIG. 32. In FIG. 32, the vertical axis represents the air pressure P; the horizontal axis to the right of the origin represents the steering angle φ towards the right and the horizontal axis to the left represents the steering angle φ towards the left.

When the player turns the steering handle 5 to the right, the air pressure P in the cylinder 410 (the solid line in FIG. 32) drops as the right steering angle increases, while the cylinder 420 (the broken line in FIG. 32) is maintained at a constant air pressure $P_0$. Accordingly, in the attitude depicted in FIG. 27, the rod 410a of the cylinder 410 is extended and retracted easily, and a shift of the player's weight toward the right side easily tilts the craft body 3000 to the right, as shown in FIG. 28. The craft body 3000 tilts more easily to the right the greater the right steering angle φ.

Conversely, as the steering handle 500 is turned to the left and the left steering angle φ increases, the cylinder 410 is maintained at a constant air pressure $P_0$ while the air pressure P in the cylinder S2 drops. The rod 420a of the cylinder 420 becomes readily extended and retracted, and a shift of the player's weight toward the left side easily tilts the craft body 3000 to the left, as shown in FIG. 29. The craft body 3000 tilts more easily to the left the greater the left steering angle φ.

The steering angle and tilt of the craft body 3000 determine the turning radius of the craft body 3000 in the game. The main board 500 inputs the steering angle and craft body tilt from the sensor signals from the steering angle sensor 1000 and the tilt sensor 120, and sets a smaller turning radius the greater these values. This makes sharp turns possible.

The example of control given above takes place at a certain travel speed. When the speed is varied through acceleration control, the slope of the sloped air pressure characteristics lines for the cylinder 410 and cylinder 420 shown in FIG. 32 changes, the slope becoming flatter at higher speeds. Accordingly, it becomes progressively more difficult to tilt the craft body by shifting body weight.

By using an appropriate combination of handle control, body weight shifting to the left or Tight, and acceleration control, a player can execute a smooth turn. However, if handle control and body weight shifting are not done in the right way, it becomes difficult to execute a desired turn, so a certain degree of skill is required. This skill requirement makes the game more interesting, and challenges the player in to improve his or her skill through repeated play.

The craft simulator 100 can be designed such that various obstacles are placed on the course, or such that waves ranging from large to small in size are generated, and these images are displayed on the television monitor 900 as the craft body 3000 is rocked by the waves. Under this scenario, the craft body 3000 can rocked up and down by the front air cylinder 300 to produce pitching while actively driving the rear air cylinders 410 and 420 to rock the craft body 3000 to the left and right to produce rolling.

As described above, the image processing unit and image processing method of the present invention allow the height of a given position on the surface of a field to be varied over time, and an object to be moved in an interactive manner over this field. In particular, it is possible to create data for interactive effects (such as boat wakes) representing interaction between object and field, to make determinations regarding contact of an object with the field surface, and to correct the tilt of an object in accordance with the slope of the field surface. In addition, since mesh treatment is used for display of physical objects partially submerged in the water within a three-dimensional virtual space, a more realistic and richer shifting field, such as a water surface over which a motor boat, jet-ski, or other object travels, can be represented. Furthermore, the mode of contact (touch) between a jet-ski or other object and the water surface in a three-dimensional virtual space can be determined accurately, and accordingly the height of the object can be accurately reflected in the image display. In addition, wakes, partially submerged objects, and the like can be represented accurately with fewer calculations.

In accordance with the game device of the present invention, a game device wherein a craft equipped with means for allowing a player to ride in real space and to input control information and with a rockably supported cage is combined with an image processing device for creating image data whereby a character portraying the aforementioned craft is moved over a field in three-dimensional virtual space in response to the aforementioned control information is provided with field shifting means for changing the height of a given position of the field surface over time and cage rocking means for rocking the cage of the craft in response to the changes in field surface height produced by this field shifting means, thereby providing the player with the impression of that the craft which he or she is riding is traveling over the surface of the water, and heightening the ambiance and interest of the game.

The craft simulator of the present invention makes it possible to rock the craft body in various ways with a small number of cylinders, and, in combination with images displayed on a television monitor, to provide exciting play whereby the player is given the impression of actually controlling a jet-ski. In addition, motion trails of moving objects are drawn and then rendered transparent so as to disappear over time, thereby reducing the load required by drawing. Since the drawn motion trails disappear in an appropriate manner, they do not impair the player's field of vision, while at the same time enhancing dramatic effect.

What is claimed is:

1. A craft simulator comprising:

a rocking component which is ridden by the player;

steering means provided to the rocking component;

steering angle sensor means for sensing the steering angle of the steering means;

support means for tiltably supporting the rocking component;

left and right tilt cylinders for maintaining left and right tilt equilibrium for the rocking component;

pressure control means for controlling the pressure applied to the left and right tilt cylinders on the basis of sensor signals from the steering angle sensor means; and control means for exchanging prescribed control signals with an image processing device for processing image data for moving an object over a field in a three-dimensional virtual space, the image processing device comprising a field shifting means for changing the height at given positions of the field surface over time; and an object moving means for moving the object over the field in an interactive manner.

2. A craft simulator as defined in claim 1, wherein the left and right tilt cylinders comprise two cylinders connected in series, with the rocking component being held in horizontal attitude when one cylinder is extended and the other cylinder is retracted; and wherein the pressure control means selects one of the two cylinders on the basis of the sensed steering angle direction from the steering angle sensor means and reduces the pressure acting on the selected cylinder in accordance with the sensed steering angle.

3. A craft simulator as defined in claim 1, further comprising:

tilt angle sensing means for sensing the left and right tilt angle of the rocking component; and turning radius determination means for determining the turn radius in the game on the basis of the tilt angle sensed by the tilt angle sensing means and the steering angle sensed by the steering angle sensor means.

4. A craft simulator as defined in claim 1, further comprising:

acceleration control means provided to the rocking component; and acceleration control sensor means for sensing the control status of the acceleration control means;

wherein the turning radius determination means determines the turn radius in the game on the basis of the tilt angle sensed by the tilt angle sensing means, the steering angle sensed by the steering angle sensor means, and the acceleration control status sensed by the acceleration control sensor.

5. A craft simulator as defined in claim 1, further comprising:

a forward/backward tilt cylinder for tilting the rocking component forward and backward;

thereby making it possible for the rocking component to tilt forward and backward as well as to the left and right.

6. A craft simulator as defined in claim 1, wherein a moving image display means is disposed in front of the rocking component, which is operated by the player riding on the rocking component while viewing the moving images displayed on the moving image display means.

* * * * *